United States Patent
Libfeld et al.

(10) Patent No.: US 10,508,631 B2
(45) Date of Patent: Dec. 17, 2019

(54) AUTOMATED WATER DRAIN SYSTEM

(71) Applicant: Clarcor Engine Mobile Solutions, LLC, Franklin, TN (US)

(72) Inventors: Felix Libfeld, Longmeadow, MA (US); Justin R. Pribanic, Broad Brook, CT (US); Ralle Rookey, Suffield, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 665 days.

(21) Appl. No.: 15/095,942

(22) Filed: Apr. 11, 2016

(65) Prior Publication Data

US 2016/0296862 A1 Oct. 13, 2016

Related U.S. Application Data

(60) Provisional application No. 62/145,092, filed on Apr. 9, 2015.

(51) Int. Cl.
| | |
|---|---|
| *B01D 35/00* | (2006.01) |
| *F02M 37/24* | (2019.01) |
| *B01D 46/00* | (2006.01) |

(52) U.S. Cl.
CPC .......... *F02M 37/24* (2019.01); *B01D 35/005* (2013.01)

(58) Field of Classification Search
CPC ........... B01D 17/00; B01D 17/0214; B01D 21/2444; B01D 27/08; B01D 29/60; B01D 35/00; B01D 35/005; B01D 35/157; B01D 36/005; B01D 35/006; B01D 2201/291; B01D 2201/295; B01D 2201/347; B01D 2201/4084; C02F 2209/42; C02F 1/00; C02F 1/40; F02M 37/22; F02M 37/221; F02M 37/24; F02M 37/28

USPC ................. 210/601, 610, 611, 744, 747, 909
See application file for complete search history.

(56) References Cited

U.S. PATENT DOCUMENTS

| | | |
|---|---|---|
| 3,019,904 A | 2/1962 | Stecher |
| 3,685,655 A | 8/1972 | Muller |
| 3,931,011 A | 1/1976 | Richards et al. |
| 4,508,621 A | 4/1985 | Jackson |

(Continued)

FOREIGN PATENT DOCUMENTS

| | | |
|---|---|---|
| EP | 1081371 A2 | 3/2001 |
| WO | 2005046827 A2 | 5/2005 |
| WO | 2015081222 A1 | 6/2015 |

OTHER PUBLICATIONS

International Search Report and Written Opinion dated Jul. 22, 2016 (PCT/US2016/026956).

*Primary Examiner* — Hayden Brewster
(74) *Attorney, Agent, or Firm* — Alix, Yale & Ristas, LLP

(57) ABSTRACT

The apparatus and related method employ fluid pressure to first separate the water accumulation chamber from the filtration chamber of a filter assembly by closing fluid flow pathways that allow water to flow into the accumulation chamber. With the chambers separated, fluid pressure is applied to the accumulation chamber to open a drain valve and push water out of the accumulation chamber. The period for which pressure is applied to the accumulation chamber can be regulated by sensors detecting a low water level, or can be timed, or both. When the water removal is completed, the fluid pressure is removed and fluid communication between the filtration chamber and the water accumulation chamber is restored.

14 Claims, 16 Drawing Sheets

(56) References Cited

U.S. PATENT DOCUMENTS

| | | |
|---|---|---|
| 4,637,351 A | 1/1987 | Pakula |
| 5,534,161 A | 7/1996 | Tarr et al. |
| 5,788,859 A | 8/1998 | Biere |
| 5,855,772 A | 1/1999 | Miller et al. |
| 5,985,144 A | 11/1999 | Janik et al. |
| 6,083,381 A | 7/2000 | Connelly et al. |
| 6,207,045 B1 | 3/2001 | Jiang |
| 6,237,628 B1 | 5/2001 | Miller et al. |
| 6,270,659 B1 | 8/2001 | Bagci et al. |
| 6,358,416 B1 | 3/2002 | Miller et al. |
| 6,371,087 B1 | 4/2002 | Condran et al. |
| 6,467,495 B2 | 10/2002 | Shost |
| 6,533,935 B2 | 3/2003 | Miller et al. |
| 6,645,372 B2 | 11/2003 | Girondi |
| 6,881,328 B2 | 4/2005 | Dittmann et al. |
| 6,974,120 B2 | 12/2005 | Wilson et al. |
| 7,150,269 B2 | 12/2006 | de Monts de Savasse et al. |
| 7,368,060 B2 | 5/2008 | Faxides |
| 7,553,415 B2 | 6/2009 | Stoehr et al. |
| 7,655,140 B2 | 2/2010 | Wieczorek et al. |
| 8,409,446 B2 | 4/2013 | Abdalla |
| 8,757,208 B2 | 6/2014 | Dornback et al. |
| 9,212,627 B2 | 12/2015 | Fulton et al. |
| 2002/0036163 A1 | 3/2002 | Miller et al. |
| 2005/0092179 A1* | 5/2005 | Barnwell ........... B01D 46/0031 95/273 |
| 2005/0133430 A1 | 6/2005 | de Savasse et al. |
| 2009/0173639 A1 | 7/2009 | Ferrari et al. |
| 2010/0133205 A1 | 6/2010 | Kuhn |
| 2012/0193300 A1 | 8/2012 | Anderson et al. |
| 2013/0153487 A1 | 6/2013 | Terry et al. |
| 2014/0007949 A1 | 1/2014 | Braunheim et al. |
| 2014/0261773 A1 | 9/2014 | Chajec |

\* cited by examiner

AUTOMATED WATER DRAIN SYSTEM

This application claims the priority of U.S. Provisional Patent Application No. 62/145,092 filed on Apr. 9, 2015, the disclosure of which is incorporated herein in its entirety.

BACKGROUND

This disclosure relates generally to filter assemblies which separate water from a flow of fluid such as diesel fuel or hydraulic fluid. More particularly, this disclosure relates to systems and methods for removing water from the water collection chamber of a filtration system.

In fuel delivery systems for which the present disclosure has application, it is critical that water and particulates be removed from the fuel supply prior to pressurization and delivery to the internal combustion engine. A pre-filter and/or fuel filter is commonly disposed between the fuel reservoir or fuel tank and a lift pump to separate water and particulates from the fuel. In this configuration, the fuel filter is disposed on the suction side of the pump. Consequently, the fuel filter is essentially under a vacuum when the associated vehicle is operating. In many conventional systems, water accumulates in a collection chamber at the bottom of the fuel filter and is regularly manually removed.

Fuel filter assemblies are typically arranged to take advantage of the fact that water has a higher specific gravity than diesel fuel and will tend to fall to the bottom of the assembly and accumulate in a chamber arranged to collect separated water. The filter assembly includes a fluid flow path for separated water to descend from the filtration chamber to a water accumulation chamber arranged below the filtration chamber. As long as these fluid flow paths remain open, the water accumulation chamber is exposed to the same low pressure as the filtration chamber. When the vehicle is not operating, opening a drain valve in the water accumulation chamber allows ambient air to enter and water to flow out by force of gravity. Such an arrangement is not practical when the vehicle is operating, because opening the drain valve would interrupt the suction of the lift pump and stop fuel delivery to the engine.

A number of systems and methods have been proposed to automatically drain water from the collection chamber of a fuel filter assembly. Many of the proposed automatic systems require that the engine be off and/or inoperative while the water is removed from the collection chamber to avoid the pressure differential and fuel interruption issues discussed above. Some water drain systems employ solenoids and elaborate circuitry for operation in order to drain water. Among other deficiencies of prior proposals are water removal systems that are complicated and relatively expensive to implement.

The disclosed apparatus, systems and methods also have applicability in hydraulic fluid systems, such as those employed on construction equipment, agricultural equipment, and the like. Hydraulic fluid is exposed to moisture, which can become mixed with the fluid and can result in corrosion, growth of organisms that foul the equipment, and other kinds of damage. Hydraulic fluid is filtered to remove particulates, and filter assemblies constructed for that purpose can be modified according to the disclosure to incorporate automatic water removal as described below.

SUMMARY

An objective of the disclosed apparatus and methods is to avoid the drawbacks of the prior art and to allow removal of water from the fuel filter assembly automatically and without requiring the engine to be off and/or inoperative. The invention is intended to allow removal of water from the filter automatically and while the engine and fuel system are operating. The invention is also intended to remove water from the water collection chamber of a fuel filter assembly where, during typical operation, the water collection chamber is in communication with the filtration chamber and is otherwise subject to a vacuum.

The apparatus and related method employ fluid pressure to first separate the water accumulation chamber from the filtration chamber of a filter assembly by closing fluid flow pathways that allow water to flow into the accumulation chamber. With the chambers separated, fluid pressure is applied to the accumulation chamber to open a drain valve and push water out of the accumulation chamber. The period for which pressure is applied to the accumulation chamber can be regulated by sensors detecting a low water level, or can be timed, or both. When the water removal is completed, the fluid pressure is removed and fluid communication between the filtration chamber and the water accumulation chamber is restored.

Another objective of the disclosed apparatus and methods is to provide a bifurcating valve in a replacement filter component. Valves and other structures situated in the water drain path of a filter assembly are exposed to particulates removed from the fluid flow and organisms that may grow in separated water. These materials can foul valve components and water sensors arranged in the water drain path, and can result in unreliable operation. According to the disclosure, valve structures are replaced along with the filter component at regular intervals, resulting in enhanced reliability. Further, placement of water sensing devices in a flow of pressurized fluid employed to move components can remove or displace accumulated particulates or slime that may build up on the water sensors and interfere with water detection.

DETAILED DESCRIPTION

Figure 1:
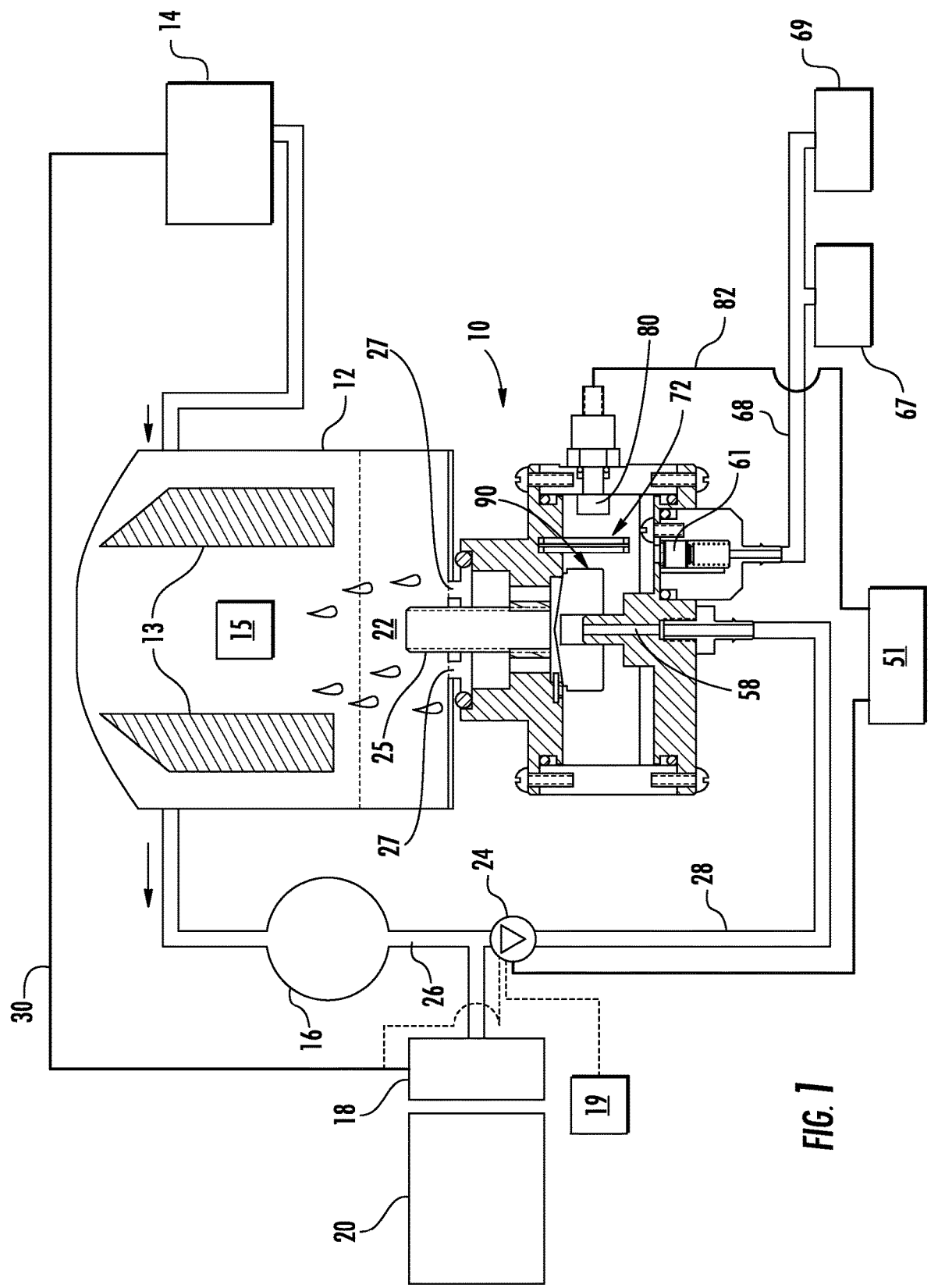
FIG. 1 is a block diagram of a portion of a fuel delivery system, including a fuel filter and an automatic water drain system for the fuel filter, of an embodiment of the invention.
Figure 2:
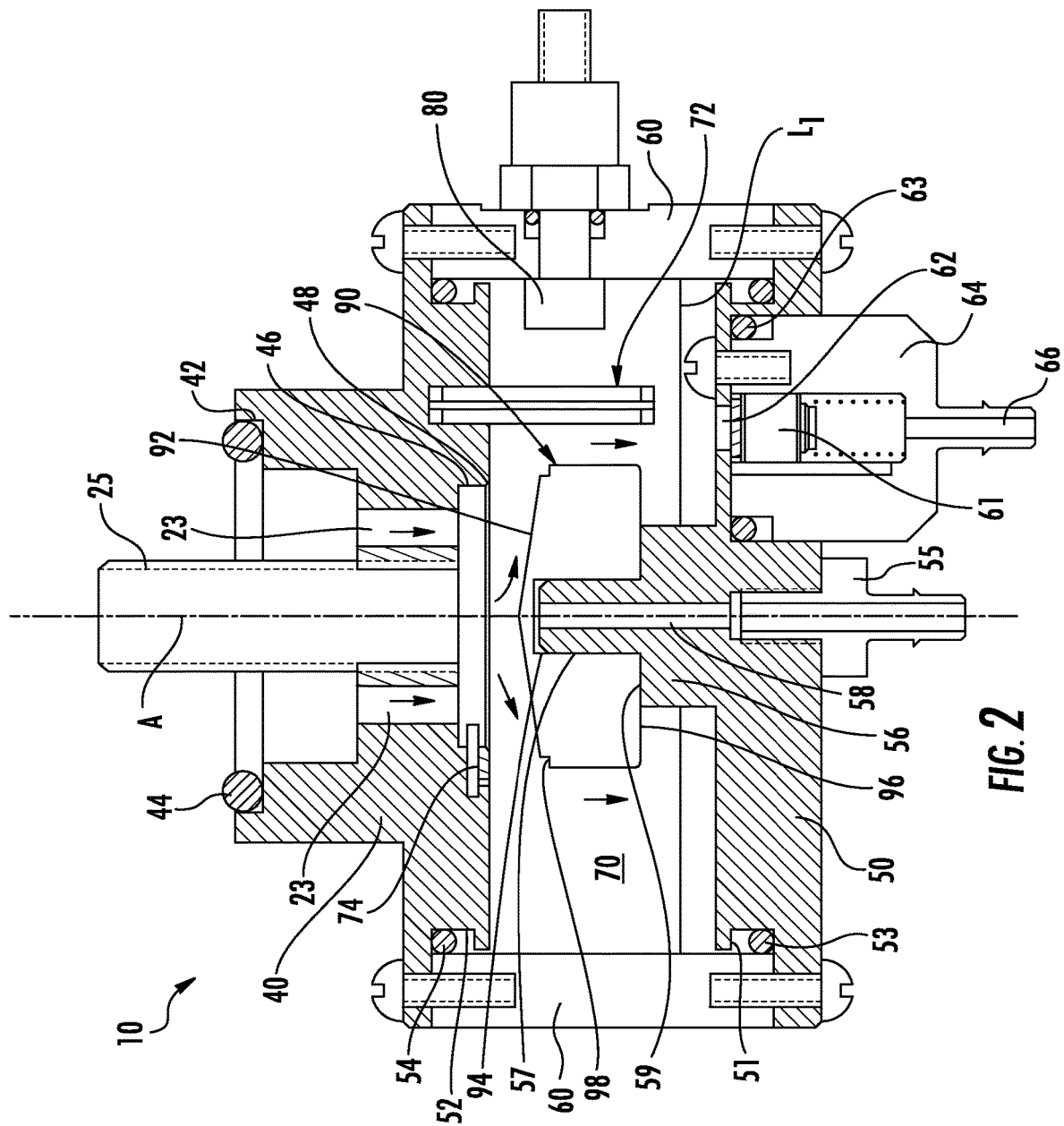
FIG. 2 is a sectional view, partly diagrammatic to show flow paths and water levels, of an automatic water drain module for the automatic water drain system of FIG. 1 with an operational valve in a first position.
Figure 3:
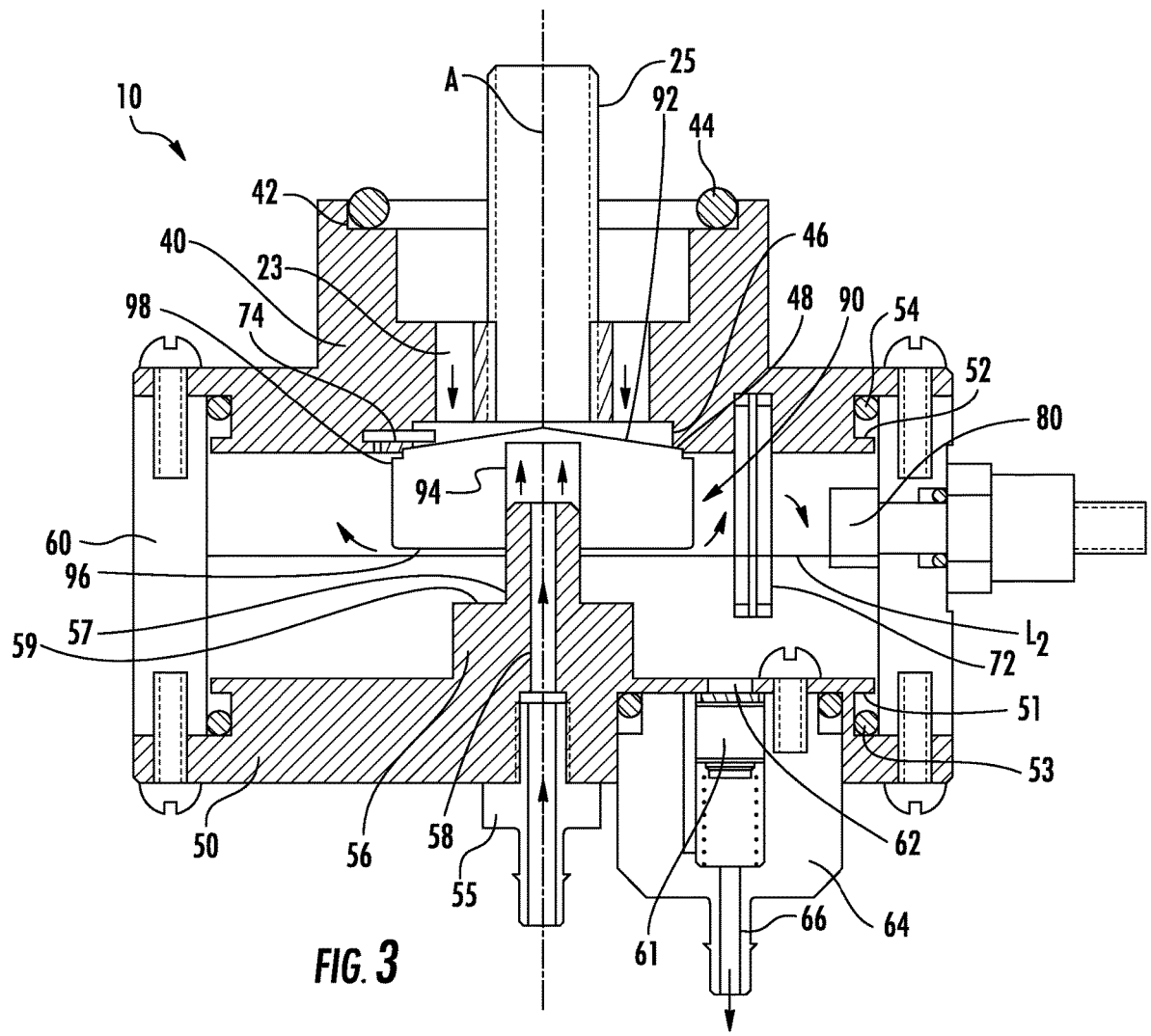
FIG. 3 is a sectional view, partly diagrammatic to show flow paths and water levels, of the representative module of FIG. 2 with the operational valve in a second position.

With reference to the drawings wherein like numerals represent like parts throughout the figures, a representative embodiment of the disclosed automatic water drain system is shown in FIGS. 1-3 and generally designated by the numeral 10. The module 10 mounts to the underside of a fuel filter 12 which is interposed between a fuel tank 14 and a lift pump 16. The lift pump 16 delivers fuel to an injection pump or an injector 18 for combustion in an internal combustion engine 20. In some embodiments, the lift pump 16 is omitted and alternative sources of pressurized fluid include the return line 30 from a fuel injection pump 18, or compressed air 19, which is commonly available on equipment using air brake systems. According to aspects of the disclosure, pressurized fluid is employed as a motive force to move system components, which eliminates the need for electrical wiring and electrically driven parts and simplifies implementation of the disclosed automatic water drain. In fuel delivery systems without a lift pump 16, the alternative sources of pressurized fluid may be employed.

It will be appreciated that the fuel filter 12 is disposed at the suction side of the lift pump 16 and fuel injection pump 18 and operates under a negative pressure as fuel is drawn from the fuel tank 14 through the filter 12. The fuel filter 12 has filter media 13 and may include a water separator 15. As fuel moves through the filter media 13, water in the form of very small droplets that are dispersed in the fuel tends to coalesce into larger droplets, which cannot pass through the water separator 15. Separated water descends to the bottom 22 of the filter 12 and passes through openings 27 communicating to module 10.

FIG. 2 illustrates the components of the module 10 in a position corresponding to normal operation. During normal operation, water descends through passages 23 defined by module 10 and into a water accumulation chamber 70 within the module 10. The water accumulation chamber is disposed below the fuel filter 12 and in fluid communication with the fuel filter housing, so separated water can flow into the collection chamber by gravity. It will be observed that with the system components in the positions shown in FIG. 2, the fuel filter 12 is in fluid communication with the water accumulation chamber 70 and is exposed to the same low pressure during normal operation of the fuel delivery system.

A water sensor 72, 80 is arranged to detect the level of water present in the water accumulation chamber 70 and generate a signal when water rises to level L2 shown in FIG. 3. When the water level L2 is detected, a signal is sent to a valve 24 disposed to communicate with a source of pressurized fluid, such as fuel. The source of pressurized fluid may be a fuel line 26 which communicates from a lift pump 16 to the fuel injection pump 18. Alternative sources of pressurized fluid include the return line 30 from the fuel injection pump 18 to the fuel tank 14, or a source of compressed air 19. A pressure line 28 is arranged to deliver pressurized fluid to the module 10 when normally closed valve 24 is opened. In the embodiment illustrated in FIG. 1-3, the valve 24 is a solenoid valve.

Pressurized fluid is delivered through coupling 55 and passage 58 to an area beneath operational valve member 90. Pressure beneath valve member 90 moves the valve member 90 from the open position shown in FIG. 2 to the closed position shown in FIGS. 1 and 3, which closes passages 23 and separates the water accumulation chamber 70 from the fuel filter 12. Valve member 90 moves on a hollow guide 57, which is configured to allow pressurized fluid to flow into the water accumulation chamber 70 beneath the valve member 90. The flow of pressurized fluid delivered to the operational valve is designed to generate sufficient motive force to move the valve member 90 to the closed position and hold it there, while additional pressurized fluid flows into the water accumulation chamber 70. Because the water accumulation chamber 70 is no longer in fluid communication with the fuel filter 12, the flow of pressurized fluid into the water accumulation chamber 70 increases pressure within the accumulation chamber 70 sufficient to overcome the bias of a normally closed outlet valve 61 to force accumulated water out of the module 10. FIG. 1 illustrates a flow path for water flowing from outlet valve 61 into a line 68 that communicates with a container 67 for storage of water and/or a drain filter 69 designed to remove volatile organic compounds (VOCs) and absorb traces of fuel before the water is released to the environment.

The water evacuation cycle that commences with detection of a high water level L2 and actuation of valve 24 to apply pressurized fluid to the operational valve member 90, may continue for a pre-determined period of time calculated to correspond to a defined volume of water removed from the water accumulation chamber. Alternatively, the module 10 may be equipped to detect a water level below L1, shown in FIG. 2. When the water level falls below L1, a signal is sent to close valve 24 and cease delivery of pressurized fluid to the operational valve member 90. When pressurized fluid is no longer delivered to the underside of operational valve 90, it descends to its open position, fluid communication between the fuel filter 12 and the water accumulation chamber 70 is restored, and separated water can again flow into the water accumulation chamber 70. The cyclic accumulation of separated water and release of the water from the module 10 is automatically repeated. The module 10 is configured so that water removal can take place while the engine and the associated vehicle are operating. Features of the operational valve member 90 may allow small amounts of fluid leakage, which will permit the pressure in the water accumulation chamber 70 to drop and permit the operational valve member to fall to its open position (See FIG. 2).

The module 10 can assume numerous forms. In one representative form, particularly depicted in FIGS. 2 and 3, the module 10 has a fluid-tight housing which, for purposes of description, has an upper filter interface component 40 and an opposite outlet component 50 which fluidly seal against the axial ends of a cylindrical side wall 60 to define the water accumulation chamber 70. As embodied in FIG. 1-3, a threaded rod 25 is shown for mechanically connecting the module 10 to the fuel filter 12. It will be apparent to one skilled in the art that other connecting means and structures are also possible.

The disclosed apparatus and methods are not limited by the disclosed configuration of module 10 and those skilled in the art will recognize many opportunities to simplify the assembly by integrating what are illustrated as separate components. Component 40 has an axially projecting upper end centrally forming a stepped axial opening. The opening interiorly defines, at the top, an enlarged first gland 42 which receives a first O-ring 44. The first O-ring 44 seals against the exterior wall adjacent the filter water drain openings 27. Although an O-ring is disclosed, any suitable seal or fluid tight connection between the fuel filter 12 and the module 10 is compatible with the disclosed apparatus and method.

Component 40 defines flow passages 23 that allow separated water to descend into the accumulation chamber 70 defined by the module 10. An enlarged interior opening 46 is surrounded by a tapered circumferential edge that defines a valve seat 48. Components 40 and 50 define glands 52 and 51, respectively to receive O-ring seals 53 and 54, respectively for sealing against a cylindrical side wall 60. The cylindrical side wall 60 is preferably formed from plastic, though it will be apparent to one skilled in the art that other materials are also possible. It will additionally be appreciated by one skilled in the art that if materials such as molded plastic or cast metal are used, multiple separate components can be replaced by a single one. This would eliminate the need for O-rings and other sealing components and features between components such as upper filter interface component 40, outlet component 50, and cylindrical side wall 60.

In the disclosed embodiment of FIGS. 1-3, components 72 and 80 are conductive elements employed to detect a level of accumulated water L2 as shown in FIG. 3. An electrically-conductive pin 72 upwardly mounted to component 40 axially extends from the component 40 into the accumulation chamber 70. Pin 72 is in conductive contact with ground, while component 80 connects with a conductor to deliver a "water present" signal to control circuitry 51. Other water detection configurations are compatible with the disclosed module and methods, including an arrangement where two conductive pins are arranged on the same support as is known in the art.

The outlet component 50 includes a stepped axial protrusion 56 symmetric about axis A and axially aligned with threaded rod 25. Protrusion 56 defines an interior axial passageway 58. Protrusion 56 terminates in a cylindrical guide 57 and has a vertically intermediate, annular shoulder 59. A central pressure inlet fitting 55 is threaded at the underside of component 50. Inlet fitting 55 connects with pressure line 28 (FIG. 1) and communicates with passageway 58 to supply pressurized fluid to accumulation chamber 70, as described below.

Component 50 has a drain opening 62 offset from the central axis A through passageway 58. The component 50 receives an outlet fitting 64 interposed across the drain opening 62. The outlet fitting 64 includes a discharge passage 66 which connects via a conduit 68 with either a collection container 67 or connects to a drain filter 69 which removes impurities and allows the drain water to discharge to the environment (FIG. 1). An outlet valve 61 controls the passage of water through the discharge passage 66 and is biased toward a closed position. Outlet valve 61 may be a spring biased check valve, an umbrella valve or the like and may be biased toward a closed position by any known method such as an elastomer component. Outlet valve 61 is configured to remain in the closed position until pressure in the accumulation chamber 70 exceeds the internal valve bias and opens the outlet valve 61. In other words, the outlet valve 61 requires a greater pressure to open than is required to move the operational valve member 90 to the closed position illustrated in FIGS. 1 and 3. The outlet fitting 64 positioned offset from the central axis includes a cylindrical recess for receiving a fourth O-ring 63 to seal the outlet fitting 64 with the component 50.

The interior of the module 10 principally formed by the components 40 and 50 and the side wall 60 defines the water collection or accumulation chamber 70. A sensor 80 is received in a side of the cylindrical wall 60 and interiorly selectively defines a potential ground path with the pin 72 interiorly of the chamber 70. Accumulated water in contact with pin 72 and sensor 80 completes a ground path. In the preferred embodiment, the ground path is located substantially above or proximate to the drain opening 62. This location of the ground path has the benefit of reducing the likelihood of fuel discharging through the drain opening 62 when the module 10 is not horizontally oriented. The disclosed proximity of ground path and drain outlet 62 reduces the likelihood that fuel will be discharged along with the accumulated water.

One embodiment of an operating valve member 90 is centrally positioned in the accumulation chamber 70 and axially bi-directionally displaceable, as shown in FIG. 2 and FIG. 3. In a preferred embodiment, the operating valve 90 has an upper shallow conical surface 92. At its periphery, the conical surface 92 is engageable against the seat 48 to substantially separate the water accumulation chamber 70 from the fuel filter 12. The valve 90 includes a central cylindrical bore 94 which is configured to receive the guide 57, with radial clearance. The valve 90 and bore 94 are configured to permit pressurized flow to the accumulation chamber 70 when the valve conical surface 92 is engaged against the seat 48. While the valve 90 is illustrated in the preferred embodiment as a pressure-actuated valve, it will be apparent to one skilled in the art that other types of valves are also possible, such as a solenoid-actuated valve. The function of the operational valve is to separate the fuel filter 12 housing from the water accumulation chamber 70 and permit a flow of pressurized fluid into the accumulation chamber 70. This functionality can be accomplished by alternative means, including separate or dual function solenoid actuated valves.

In an initial position best illustrated in FIG. 2, the lower planar surface 96 of the valve 90 rests on the annular shoulder 59 of the protrusion 56. In one embodiment, the valve 90 has a stainless steel composition and has a weight of approximately 39 grams. In that embodiment, the valve 90 is accordingly dimensioned and configured so that at a pressure of 8 pounds per square inch exerted through the passageway 58 results in a 178-gram lift force to propel the valve 90 to the seated configuration of FIG. 3. The valve 90 may also include a notch 98 or other features at its upper portion to facilitate the unseating of the valve 90 when pressurized fuel is no longer being delivered to passage 58, as will be further described below. It will be apparent to one skilled in the art that other features may be used to ensure a less than complete pressure seal between the fuel filter 12 and the water accumulation chamber 70, such as one or more ridges along the upper portion of the valve 90 or one or more properly sized and located passageways between the two, such as the fluid pressure release 74.

With reference to FIG. 2, in a normal accumulation mode of the module 10, separated water from the fuel filter 12 descends through the one or more passages 23 and accumulates at the bottom of the water accumulation chamber 70. It will be appreciated that at a representative low first water level $L_1$, the valve 90 essentially rests on the annular shoulder 59. The outlet valve 61 is normally biased to a closed position. As the water level rises to a predetermined second level $L_2$ (FIG. 3) in the accumulation chamber 70, the water displaces non-conductive fuel and eventually closes a ground path between the pin 72 and the sensor 80, which initiates a water evacuation cycle.

It will be appreciated that the fluid pressure release 74, or its functional equivalent, assists in breaking the seal between the valve 90 and the seat 48. The outlet valve 61 will eventually close and the valve 90 will descend downwardly. The fluid pressure release 74 quickly reduces the pressure differential between the fuel filter 12 housing and the accumulation chamber 70 so as to release the valve 90 from the seat 48, opening the one or more inlet passages 23 into the accumulation chamber 70 to repeat the described accumulation/drain cycle.

Figure 4:
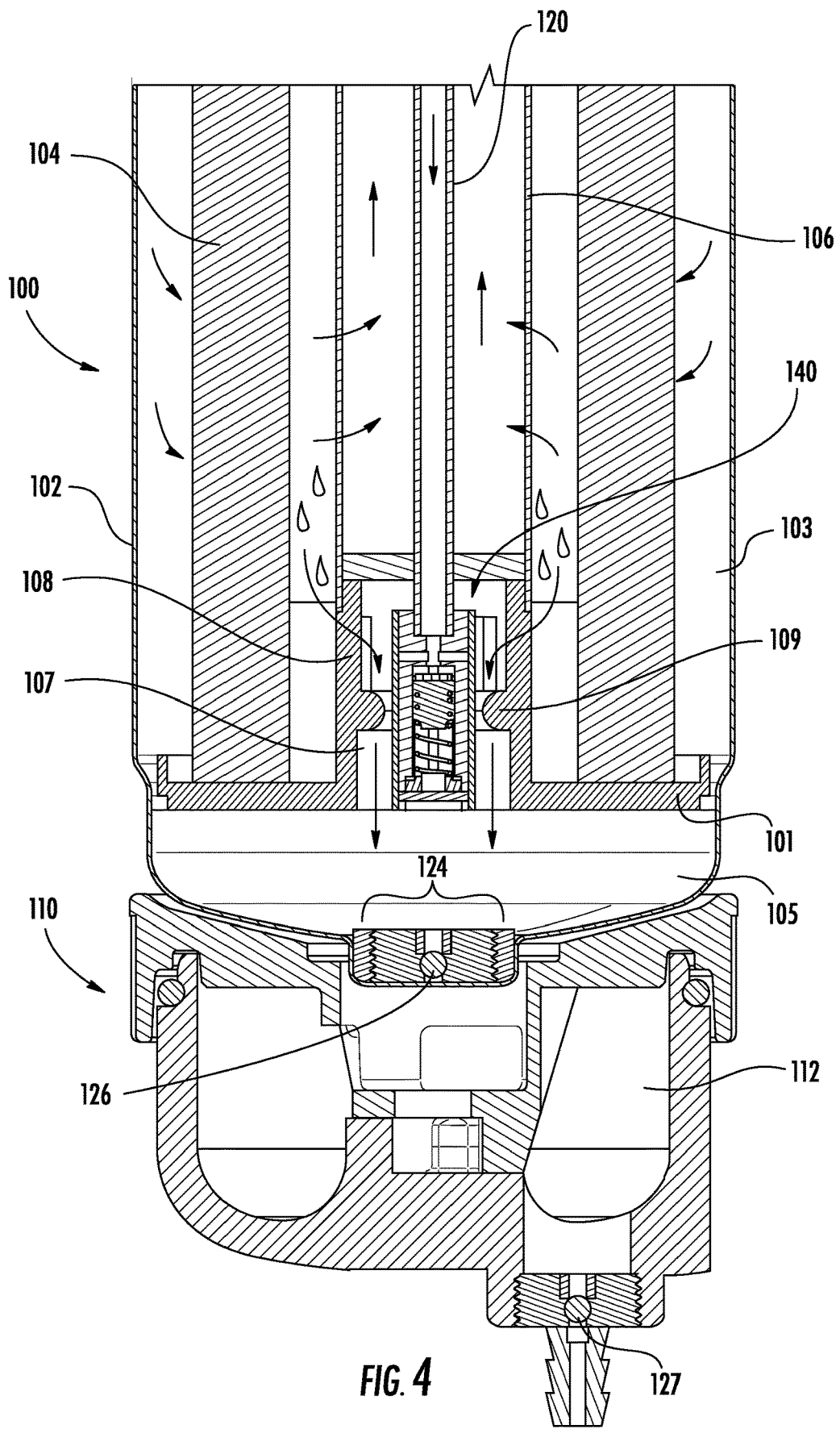
FIG. 4 is a sectional view of a filter cartridge equipped with components of an automatic water drain system, shown in conjunction with a water collection/filtration bowl according to aspects of the disclosure.
Figure 5:
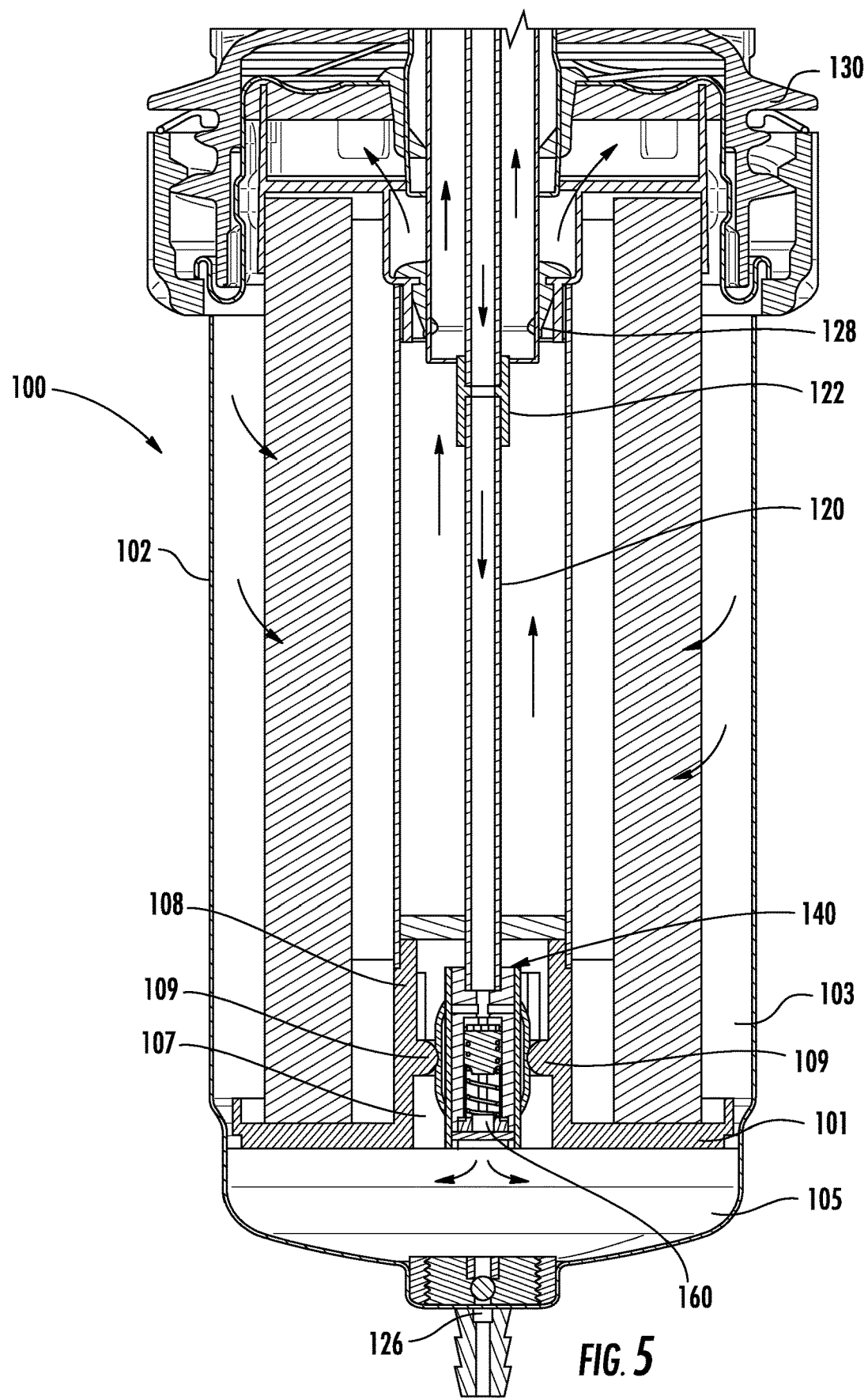
FIG. 5 is a sectional view of the filter cartridge of FIG. 4 mounted to a filter head according to aspects of the disclosure.

FIG. 4 illustrates an alternative embodiment of a filter cartridge 100 and associated water collection/filtration bowl 110. FIG. 5 illustrates the filter cartridge 100 without the water collection/filtration bowl 110. An automatic water drain system incorporating this embodiment of a filter cartridge will operate on the same general principles as module 10 described above. The embodiment of FIGS. 4 and 5 incorporates components of the automatic water drain into the filter cartridge 100, rather than a module mounted to the filter cartridge as in the embodiment of FIGS. 1-3. Specifically, the operational valve is incorporated into filter cartridge 100 at reference numeral 140. Water sensing components may be incorporated into the relevant region of the filter cartridge 100 through the opening 124 at the bottom of the cartridge housing 102. Alternatively, water sensing may be arranged in a water collection/filtration chamber 112 defined by the water collection/filtration bowl 110. Water sensors detect the level of water and provide signals to a control circuitry such as 51 (See FIG. 1). In response to a signal indicating a high water level, a controlled flow of fluid pressure is provided to the operational valve 140 and provides motive force to move components. The operational valve is configured to employ fluid pressure to first separate the filtration chamber 103 from the water accumulation chamber 105, and then pressurize the water accumulation chamber 105 to force water out of the filter cartridge housing 102 through check valve 126.

The filter cartridge 100 has a housing 102 which surrounds a cylindrical arrangement of filter media 104 for removing particulates. A water separator 106 is positioned within the filter media 104 and arranged to reject water coalesced from a flow of fuel through the filter cartridge 100 as shown by the arrows in FIG. 4. Fuel flows radially inward through the filter media 104 and then through the water separator 106, exiting the filter cartridge 100 upper end through a central opening surrounded by a grommet 128 best shown in FIG. 5. The filter cartridge mounts to a filter head 130 with coaxial conduits projecting from the head 130 to interface with corresponding sealing structures on the cartridge to define separate flow paths into and out of the cartridge housing 102. As shown in FIG. 5, the upper end of the cylinder of filter media 104 is embedded in adhesive material at the top of the filter housing 102, while the bottom end of the filter media 104 is bonded, glued or staked to a lower end cap 101. The lower end cap 101 extends radially, meeting the housing 102 to separate a filtration chamber 103 above the lower end cap 101, from a water accumulation chamber 105 below the lower end cap 101. As shown in FIG. 4, separated water rejected at the water separator 106 falls to the bottom of the cartridge housing 102 through a central opening 107 defined by a central cylindrical projection 108 of the lower end cap 101. An annular ring 109 projects inwardly from the inside surface of the projection 108.

The term "filter media" as used in this application applies to structures and materials intended to remove particulates from a fluid flow as well as structures intended to separate water from a fluid flow, such as a hydrophobic screen. Water can be rejected at the inlet face of a single stage filter media, or can be coalesced during passage through a fibrous media and then separated at a hydrophobic screen. In both cases, water can be said to be separated from the flow of fluid as is passes through the filter media.

The operational valve 140 of filter cartridge 100 is situated inside the cylindrical projection 108. Operational valve 140 is a fluid actuated valve and receives fluid pressure through pressure tube 120, which passes axially through the cartridge 100 from a connector 122 situated in a central opening defined by the cartridge housing 102 at its upper end (See FIG. 5). In response to a signal from control circuitry indicating a high water level, fluid pressure is delivered to pressure tube 120 from the filter head 130 through a tube complementary to connector 122. Sources of fluid pressure include a lift pump 16, fuel injection pump 18, or compressed air 19 as shown in FIG. 1.

Figures 6, 7:
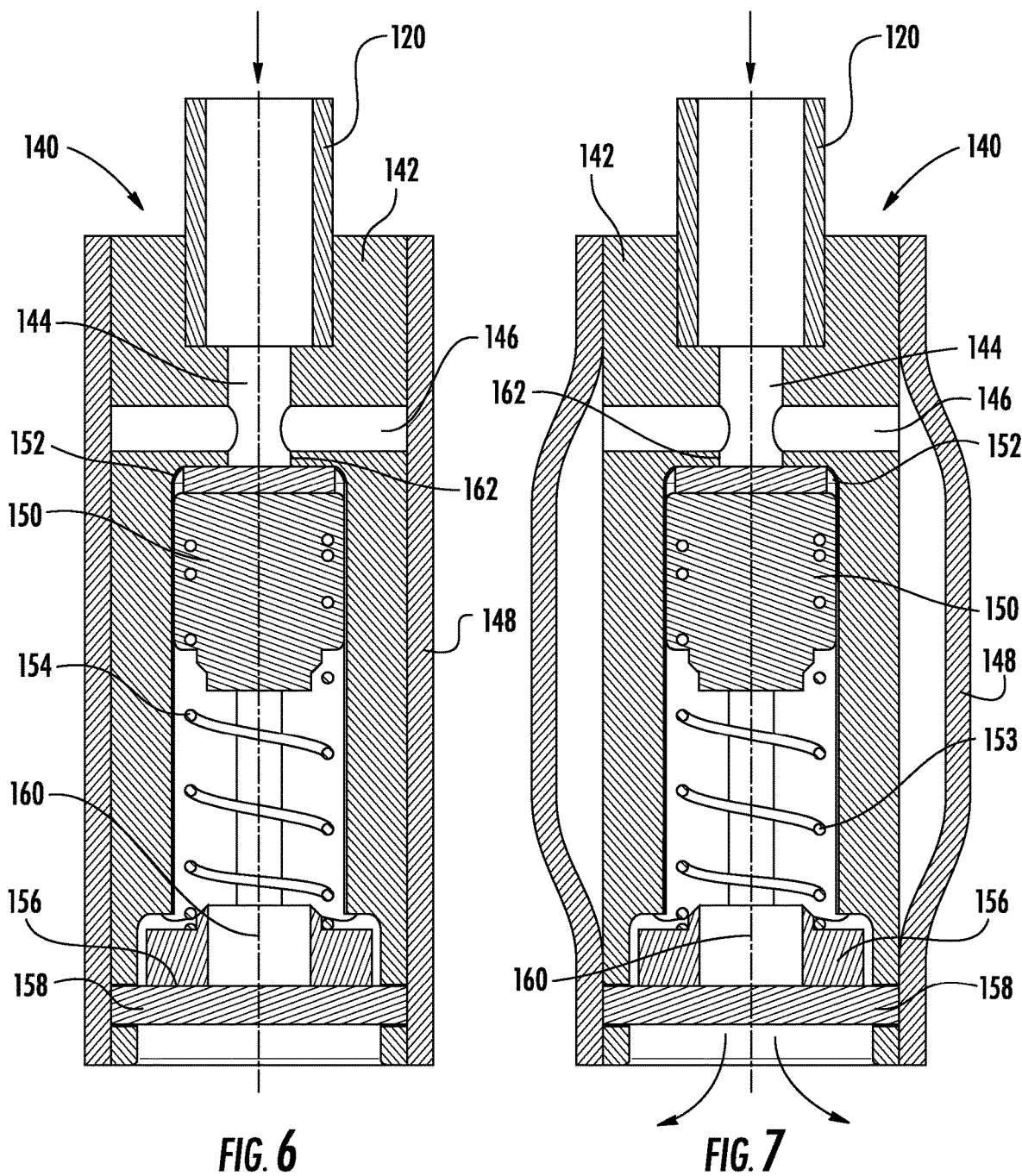
FIGS. 6 and 7 are enlarged sectional views illustrating details of the operational valve of the filter cartridge of FIGS. 4 and 5.

Details of the operational valve 140 are illustrated in FIG. 6, showing the operational valve in a pre-actuation state (also shown in FIG. 4) and FIG. 7, showing the operational valve 140 in an actuated state (also shown in FIG. 5). The operational valve 140 includes a body 142 with a stepped axial bore 144 intersected by at least one transverse bore 146. The body 142 is surrounded by an elastic sheath 148 that is sealed to the outside surface of the body 142 above and below transverse bore 146. The stepped axial bore 144 includes an upper end configured to receive the pressure tube 120. A lower end of the axial bore 144 surrounds a spring-biased relief valve member 150 carrying a seal 152 biased against a seat 162 by spring 154, forming a normally closed, pressure-actuated valve having a pre-defined opening pressure P2. The spring 154 is supported by a plug 156 defining a central aperture 160. The plug 156 is retained in the valve body 142 by a pin or clip 158 that does not obstruct fluid flow through the aperture 160. Fluid pressure entering the operational valve 140 initially encounters the relief valve member 150 in its closed position and flows through transverse bore 146 to inflate the central portion of the elastic sheath 148 as shown in FIGS. 5 and 7. In response to an actuating pressure P1, sheath fully inflates to contact inward projecting ring 109 to close the fluid flow path connecting the filtration chamber 103 from the water accumulation chamber 105.

After sheath 148 is fully inflated, pressure accumulates within the axial bore 144 of the valve body 142 until a second pressure P2 is reached, which is sufficient to move the relief valve member 150 away from seat 162 as shown in FIG. 7. Movement of the relief valve member 150 away from seat 162 opens a flow path through the axial bore 144 of the operational valve 140. Fluid flowing through the operational valve as shown in FIGS. 5 and 7 pressurizes the water accumulation chamber 105 to a third pressure P3 sufficient to open check valve 126 and force water out of the cartridge housing 102. When the control circuitry determines sufficient water has been ejected from the filter housing 102, the pressure is removed from pressure line 120 and the operational valve 140 returns to its pre-actuation state as shown in FIGS. 1 and 6. The flow path for separated water through the opening 107 in the lower end plate is opened, pressure in the water accumulation chamber 106 and water collection/filtration bowl 110 (in the configuration of FIG. 4) is relieved and the check valves 126, 127 return to their closed position.

With reference to FIG. 4, the disclosed automatic water removal system may incorporate a water collection/filtration bowl 110 secured to the bottom of the filter cartridge 100 and in sealed, regulated fluid communication with the water accumulation chamber 105 of the filter cartridge. The system is configured so that only separated water passes check valve 126 to enter the water collection/filtration chamber 112. Chamber 112 may incorporate filter materials and or materials selected to remove VOCs or traces of fuel that may enter the water collection/filtration bowl 110. In the embodiment of FIG. 4, a second check valve 127 regulates flow of water out of the chamber 112. The opening pressure of check valve 127 is selected to be at least as high as the opening pressure P3 of check valve 126, so as to remain closed at all times when water is not being evacuated from the filter housing 102. The opening pressure of both check valves 126, 127 can be relatively light, since the water accumulation chamber 105 and the water collection/filtration chamber 112 are normally exposed to a low operating pressure. Further, P3 should be less than actuating pressure P1 to prevent fluid from being forced past the closed operational valve during a water evacuation cycle. P3 should be sufficient to keep outlet check valves 126, 127 in the closed position under all circumstances except during a water evacuation cycle.

FIGS. 8-11 depict a further embodiment of a filter cartridge 200 incorporating components of an automatic water drain system according to aspects of the disclosure. Filter cartridge 200 incorporates a fluid actuated operational valve 240 and includes a pressure line 220 that receives fluid pressure under direction of a control circuit as previously described. The filter cartridge 200 mounts to and fluidly communicates with a filter head in a manner consistent with filter cartridge 100 described above. Filter cartridge 200 includes a housing 202 surrounding a cylindrical arrangement of filter media 204, which may be treated or selected to have properties that will reject water, as is known in the art. The housing 202 supports a vented drain nut 228 that defines a drain opening and includes a threaded inside surface. A fastener 223 extends upwardly through the water collection bowl 210 to engage the drain nut and support the water collection bowl 210 in a sealed relationship against the bottom of the cartridge housing 202. Seals are arranged to contain the fluid being filtered and resist pressure applied to the system components during water evacuation cycles. The water collection/filtration bowl 210 defines a water collection chamber 212 to collect separated water.

Figure 8:
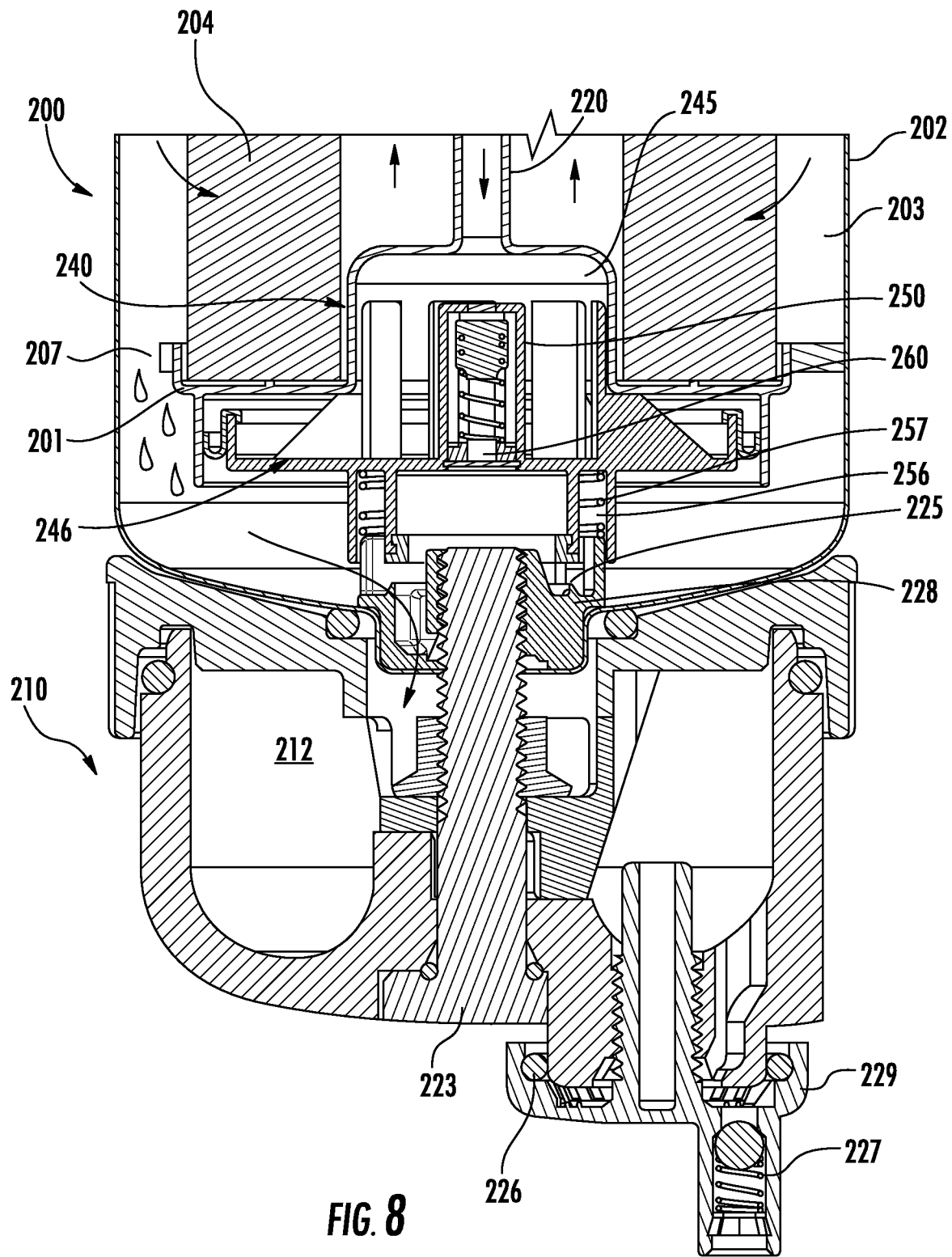
FIG. 8 is a sectional view of an alternative embodiment of a filter cartridge and water accumulation/filtration bowl equipped with components of an automatic water drain system according to aspects of the disclosure.

A lower end cap 201 is bonded to the lower end of the filter media 204, radially projects to contact the housing for support and defines flow openings 207 adjacent an inside surface of the housing 202. Openings 207 are always open, resulting in a single pressure zone inside the housing 202, which will be referred to as the filtration chamber 203. Separated water descends through openings 207 to the bottom of the housing 202 and then through passages defined by the drain nut 228 as shown in FIG. 8. Drain nut 228 includes an annular ridge 225 that defines an outer boundary surrounding the flow paths through the nut 228. Water sensing components, which are well understood in the art, are arranged in the water collection chamber 212 and/or in the lower part of the housing 202 to detect water levels and provide signals corresponding to high and low water levels for use by a control circuit such as 51 illustrated in FIG. 1. A vented drain cap 229 closes a water outlet communicating with the water collection chamber 212. The drain cap 229 includes a check valve 227 similar in construction and function as check valves 126 and 127 described above.

Figure 9:
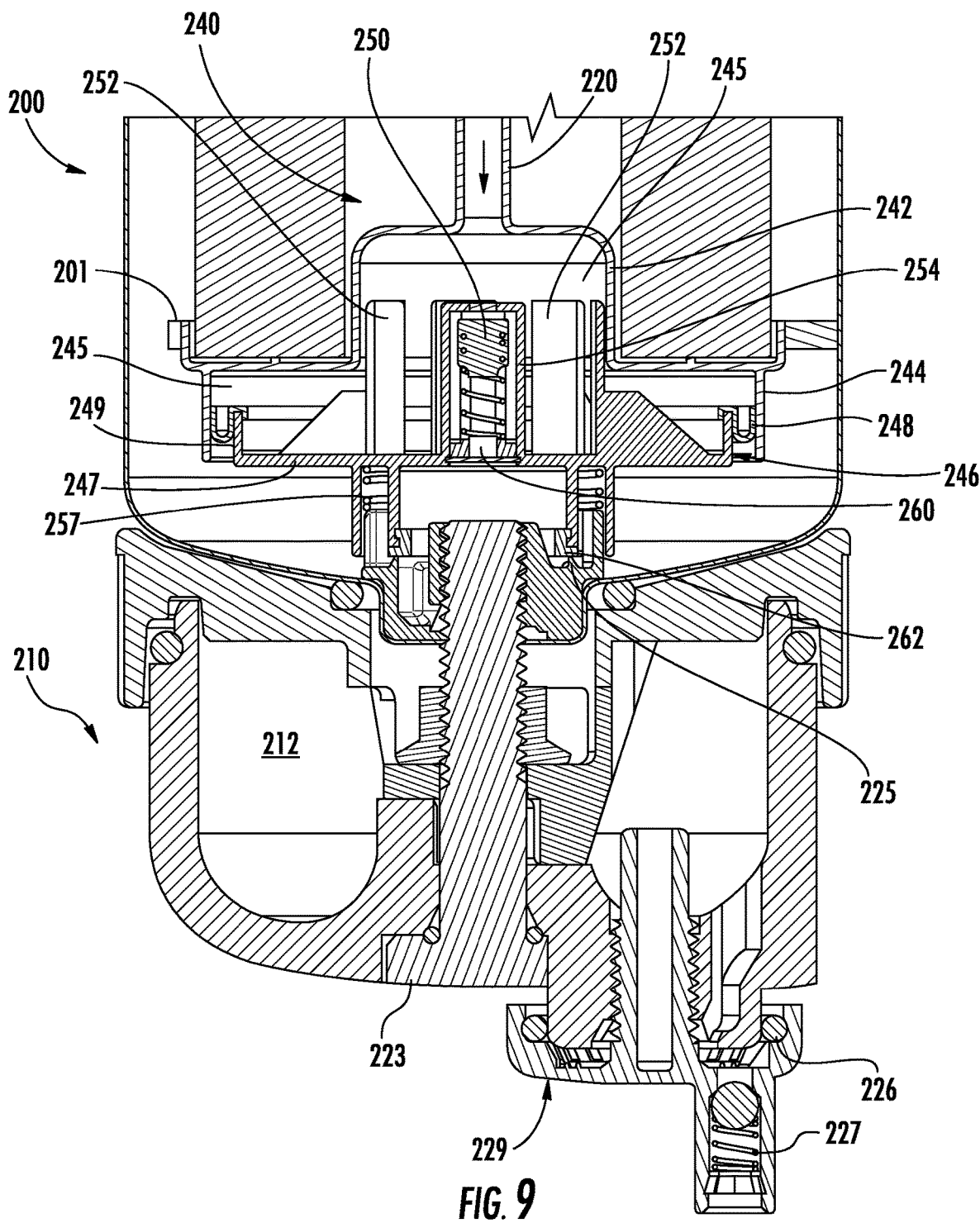
FIG. 9 is a sectional view of the filter cartridge and water accumulation/filtration bowl of FIG. 8, showing the parts in a position corresponding to the beginning of a water evacuation cycle.

With reference to FIG. 9, the operational valve 240 occupies a region of the interior of the cartridge housing 202 centered above the drain nut 228. Lower end cap 201 defines a central, cylindrical cup 242, and a downward projecting annular skirt 244 that together define the upper boundary of a pressure chamber 245. Although en cap 201 is depicted as a single, unitary molded part, it could also be constructed from a plurality of complementary parts. An operational member 246 and diaphragm seal 248 define the lower boundary of pressure chamber 245, which communicates with pressure line 220. Operational member 246 includes a plate 247 reinforced by radial webs and extending from a central opening to a peripheral, annular lip 249. Diaphragm seal 248 extends between the skirt 244 of the lower end cap 201 to the lip 249 of the operational member 246 to create a flexible seal permitting operational member 246 to reciprocate axially between an open position shown in FIG. 8 and a closed position shown in FIGS. 9-11. Guide fingers 252 project upwardly from plate 247 to align operational member 246 within cup 242, and control movement of the operational member 246 in sliding contact with the inside surface of the cup 242.

An opening 260 at the center of operational member 246 includes a cylindrical container 254 surrounding relief valve 250. Relief valve 250 has a similar construction and function as relief valve 150 described in relation to cartridge embodiment 100 above. Relief valve 250 is biased toward a closed position depicted in FIGS. 8 and 9 and regulates flow of pressurized fluid through operational member 246. A pair of cylindrical structures project from a bottom surface of plate 247 to define an annular channel 256 that contains a spring 257 arranged to bias operational member 246 toward the open position depicted in FIG. 8. The channel 256 cooperates with complementary structures on the drain nut 228 to guide movement of operational member 246 and maintain alignment between the operational member 246 and drain nut 228. The inner cylindrical structure supports an annular seal 262 arranged to seat against annular ridge 225 of the drain nut 228 when the operational member 246 is in the closed position depicted in FIGS. 9-11.

Figure 10:
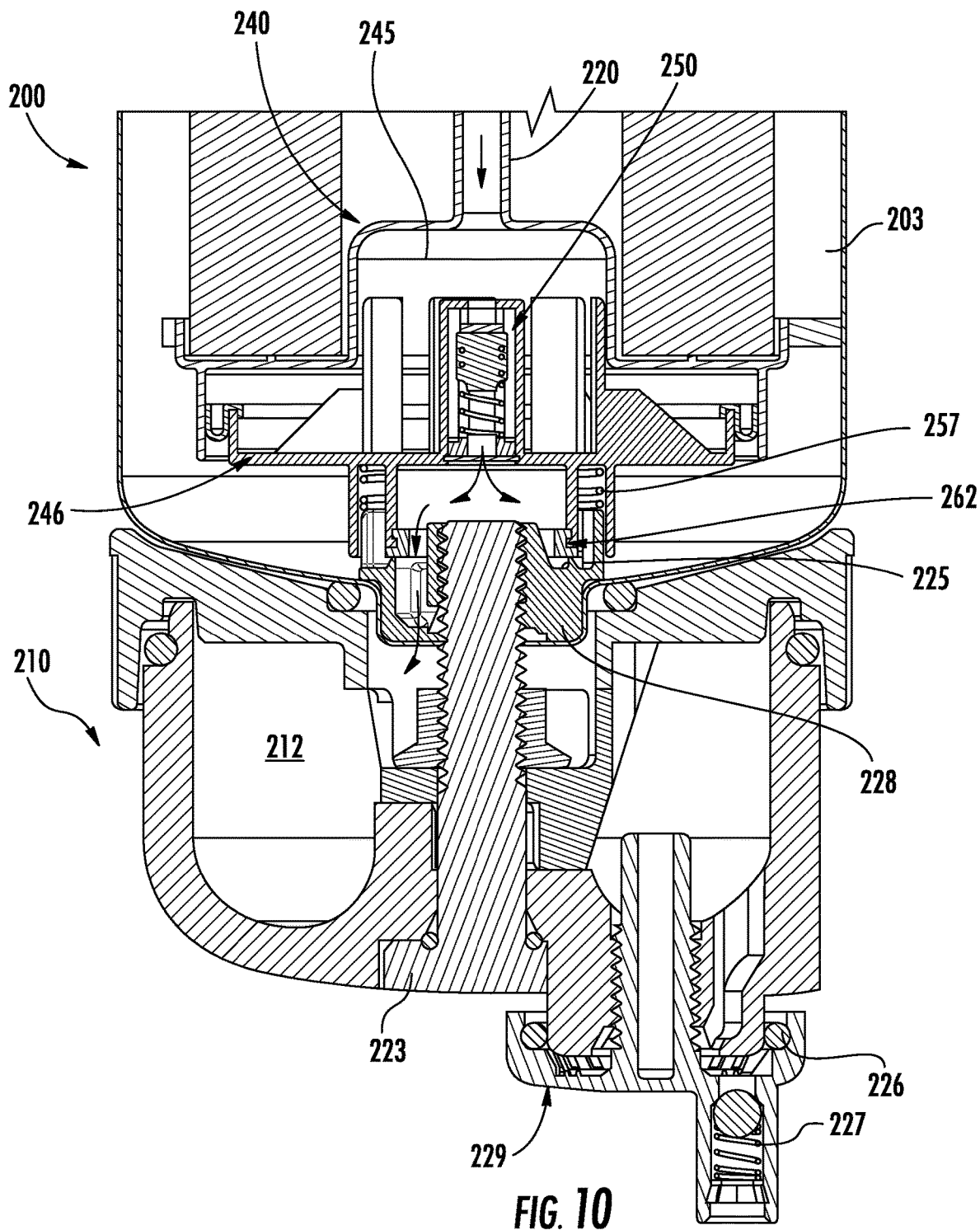
FIG. 10 is a sectional view of the filter cartridge and water accumulation/filtration bowl of FIGS. 8 and 9, showing the parts in a position corresponding to the step of pressurizing the water accumulation/filtration bowl.
Figure 11:
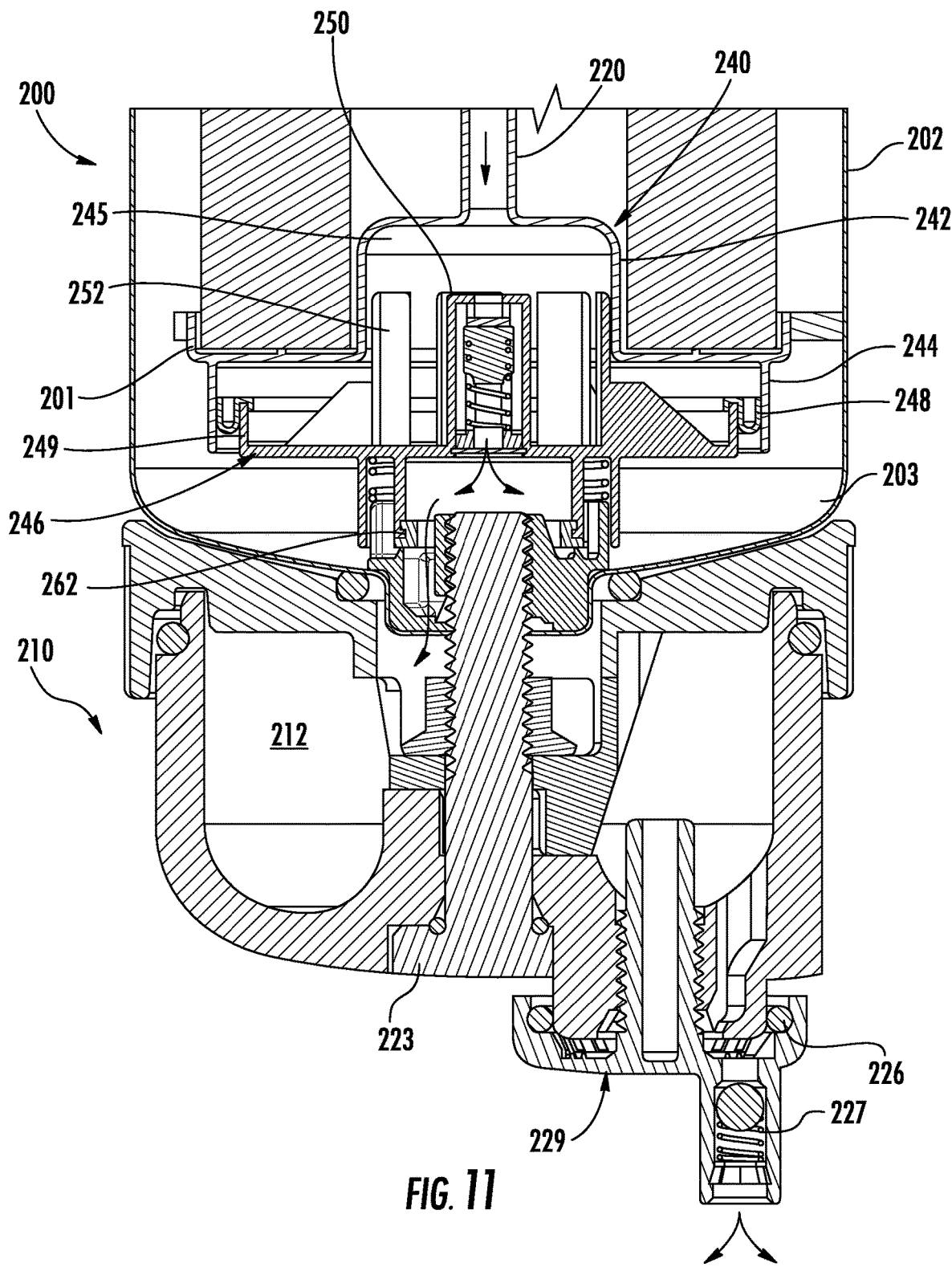
FIG. 11 is a schematic view of the filter cartridge and water accumulation/filtration bowl of FIGS. 8-10, showing the parts in a position corresponding to the final stage of water evacuation.

To initiate a water evacuation cycle, pressurized fluid is delivered through pressure line 220 under direction of control circuitry, pressurizing chamber 245 to an actuation pressure P1 that generates force on the operational member 246 sufficient to overcome the bias of spring 257. Operational member 246 moves from the open position shown in FIG. 8 to the closed position shown in FIGS. 9-11, seating seal 262 against the drain nut 228 annular ridge 225 to separate the filtration chamber 203 of the cartridge 200 from the water accumulation chamber 212 of the water collection bowl 210. After operational member 246 is moved to the closed position, pressure in chamber 245 continues to increase until the cracking pressure P2 of the relief valve 250 is reached. P2 is higher than P1, so relief valve 250 remains closed so long as the operational valve 240 is in the open position. FIG. 9 shows the components of operational valve 240 in positions corresponding to a pressure in chamber 245 of between P1 and P2, so the operational member has closed off fluid communication between the filtration chamber 203 and the water collection chamber 212, but the relief valve 250 remains in a closed position. When pressure P2 is present in chamber 245, relief valve 250 opens as depicted in FIG. 10, allowing pressurized fluid to flow from chamber 245 through relief valve 250, opening 260, drain nut 228 and into water collection chamber 212. Fluid entering water collection chamber 212 forces water out of the water collection chamber 212 when the opening pressure P3 of the check valve 227 is reached as depicted in FIG. 11. Opening pressure P3 of check valve 227 can be relatively light, since the water collection chamber 212 is normally exposed to the same low pressure as the filtration chamber 203. Opening pressure P3 is less than the opening pressure P2 of relief valve 250 and the actuation pressure P1 of the operational valve 240, which ensures that fluid pressure applied to the water collection chamber 212 does not rise to a level that would force fluid past the closed operational member 246. Opening pressure P3 needs to be sufficient to ensure that outlet check valve 227 remains closed unless water is being evacuated from the water collection chamber 212.

FIGS. 12-16 illustrate another alternative embodiment of a filter cartridge 300 incorporating an alternative fluid actuated operational valve 340 according to aspects of the disclosure. A housing 302 surrounds a cylindrical arrangement of filter media 304 in a filtration chamber 303. The filter media 304 may be treated or selected to have surface properties that reject water, as is known in the art. Cartridge 300 receives pressurized fluid under direction of a control circuit via pressure line 320 as previously described. A lower end cap 301 is connected to the lower end of the filter media 304 and includes a ring 364 supported to form part of a gland for a seal 368 against the inside surface of housing 302. A bottom plate 370 forms the remainder of a gland for seal 368 and includes upward projecting snap features 374 configured to catch an inside edge of ring 364, thereby connecting the bottom plate 370 to the lower end cap 301. The connected lower end cap 301 and bottom plate 370 define flow paths 372 for separated water to flow radially inwardly from the annular space between the housing 302 and the filter media 304. Bottom plate 370 includes a cylinder 378 having a sharp annular upper end 379 surrounding an opening 375 through the bottom plate 370. Cylinder 378 is the inner boundary of an annular channel 376 that receives the bottom end of a spring 357.

Figure 16:
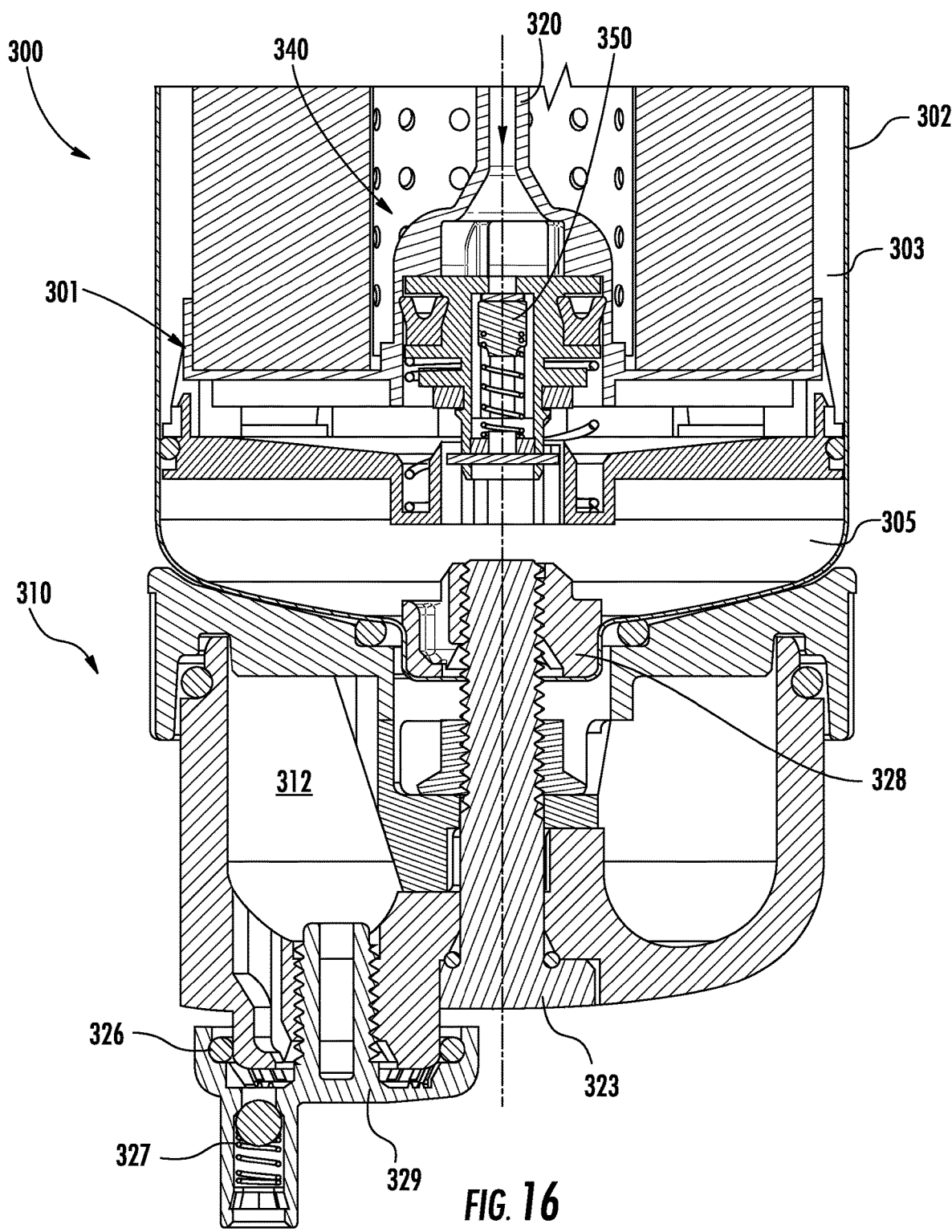
FIG. 16 is a sectional view of the filter cartridge of FIGS. 12-15 in conjunction with a water accumulation/filtration bowl according to aspects of the disclosure.

Housing 302 supports a drain nut 328 with a threaded bore that can be engaged by either a drain cap 329 or a fastener 323 supporting a water collection bowl 310 as shown in FIG. 16. Drain cap 329 incorporates an outlet check valve 327, the operation of which is consistent with check valves 127 and 227 described above. The structure and function of the water collection bowl 310, which defines a water collection chamber 312, is consistent with that of water collection bowl 210 described above. Water sensing may be situated in either the water collection chamber 305 or water accumulation chamber 312 as previously described.

Figure 13:
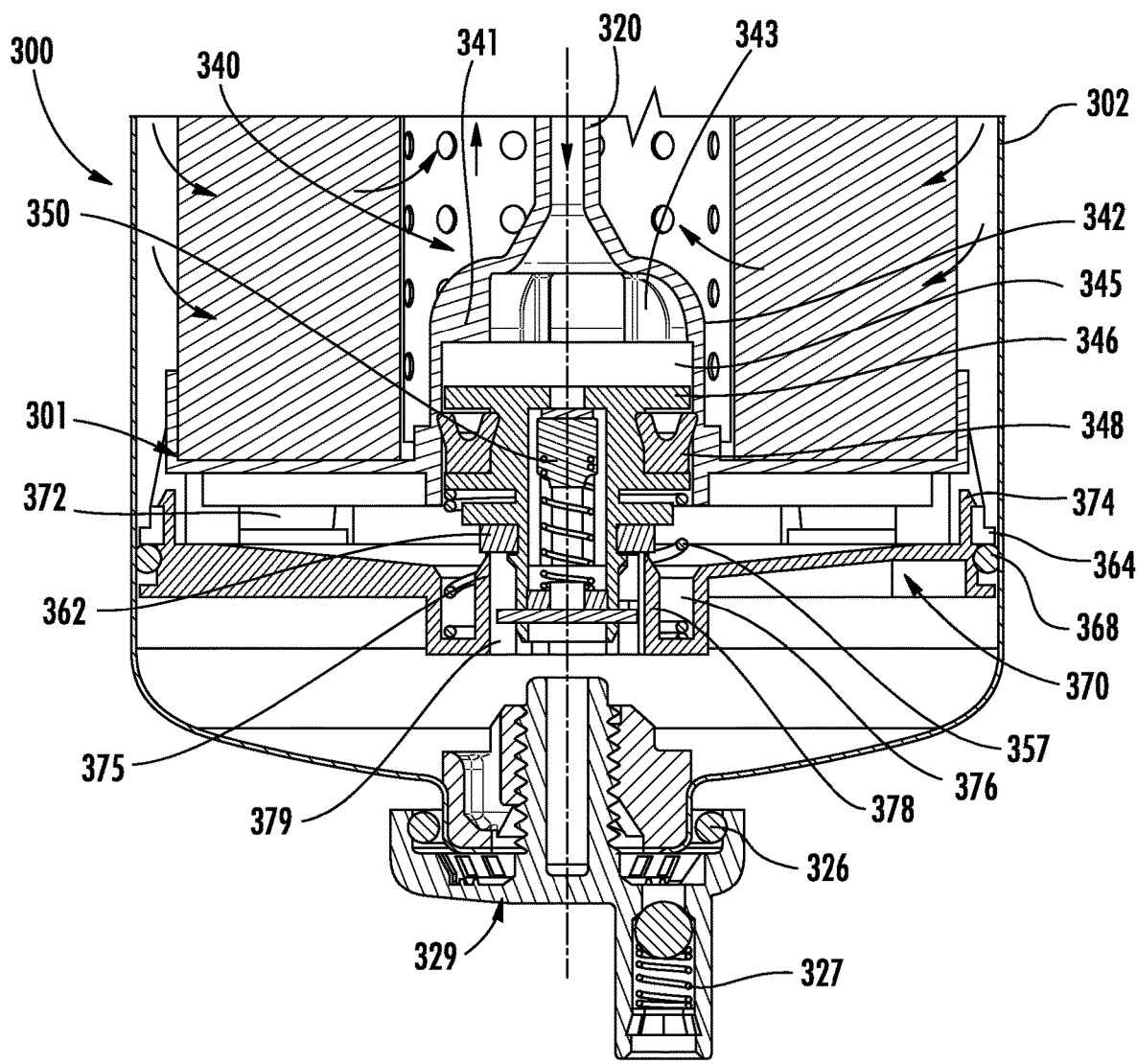
FIG. 13 is a sectional view of the filter cartridge of FIG. 12, showing the parts in a position corresponding to the beginning of a water evacuation cycle.
Figure 14:
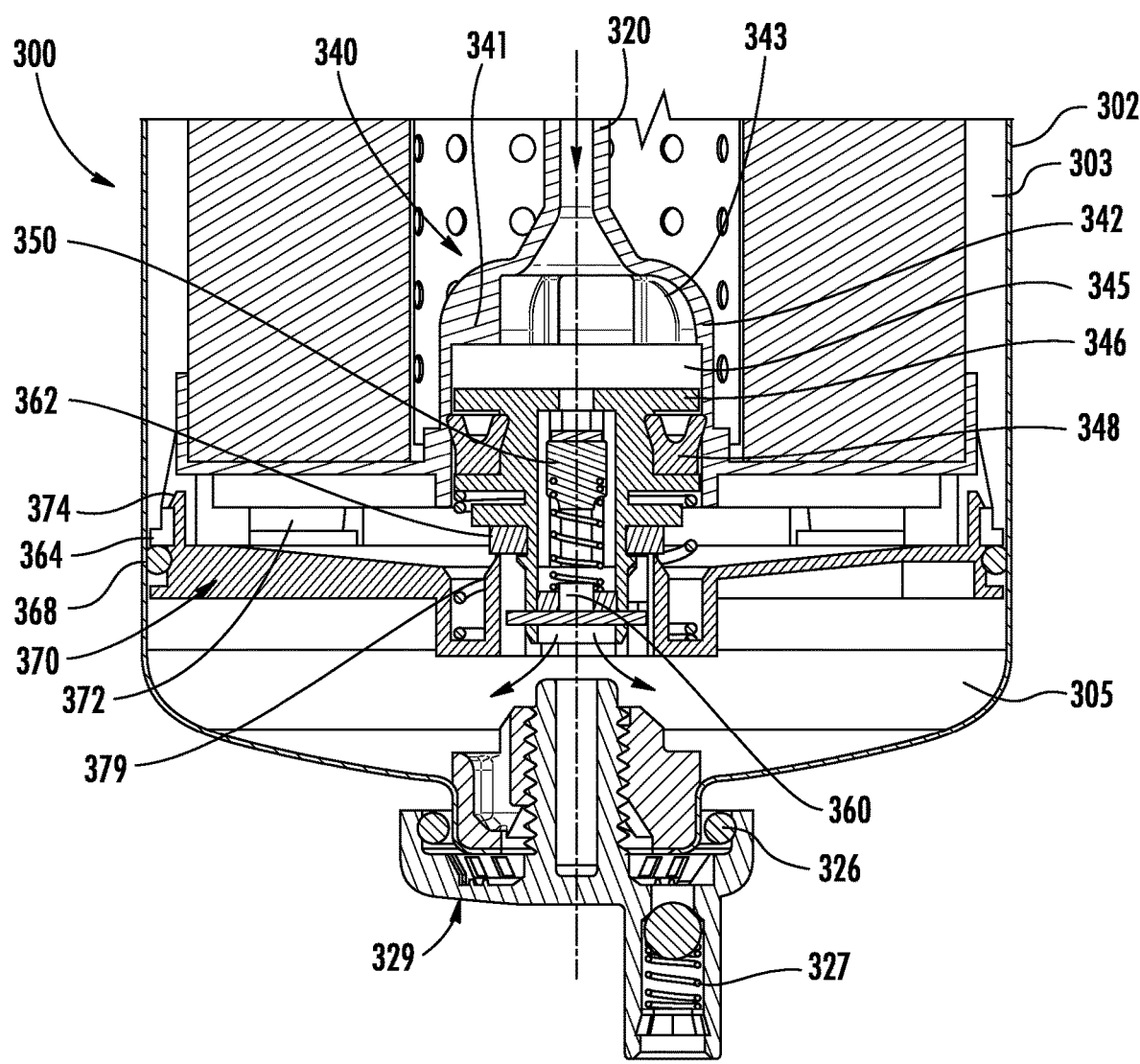
FIG. 14 is a sectional view of the filter cartridge of FIGS. 12 and 13, showing the parts in a position corresponding to the step of pressurizing the water accumulation chamber.
Figure 15:
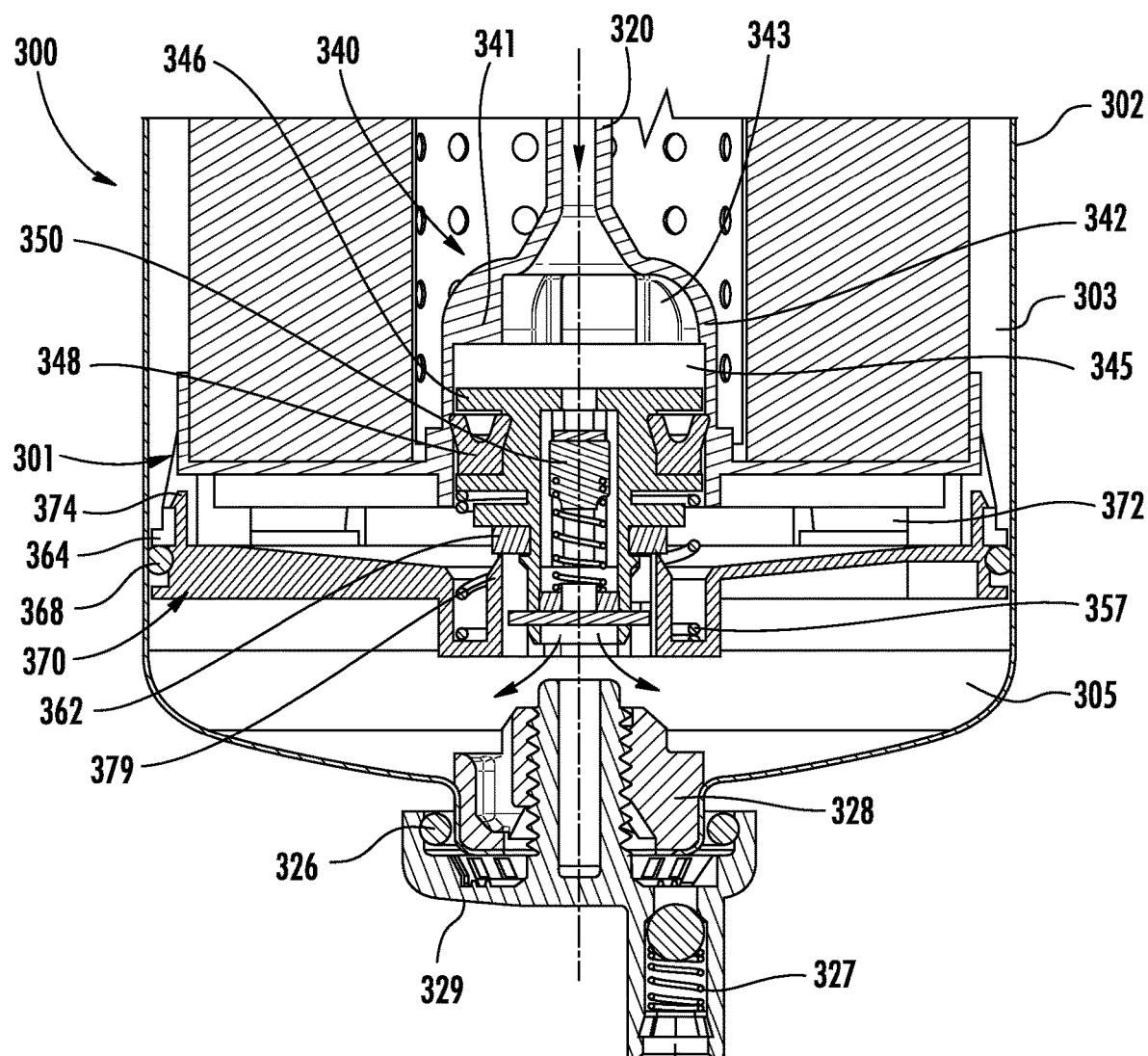
FIG. 15 is a sectional view of the filter cartridge of FIGS. 12-14, showing the parts in a position corresponding to the step of evacuating water from the water accumulation chamber.

Lower end cap 301 includes a cylindrical cup 342 defining the upper portion of a pressure chamber 345 in communication with pressure line 320. The cup 342 includes a plurality of inward projecting webs 343 that together define a shoulder 341 best seen in FIGS. 13-15. An operational member 346 is arranged to axially reciprocate in cylindrical cup 342 between an open position shown in FIGS. 12 and 16 and a closed position shown in FIGS. 13-15. The operational member 346 is biased toward the open position by spring 357, and when in the open position, a top surface of the operational member 346 abuts shoulder 341. Operational member 346 carries a cup seal 348 that engages an inside surface of the cylindrical cup 342 to form a sliding seal containing pressure above the operational member 346. Operational member 346 includes an axial bore which contains a relief valve 350. The structure and function of relief valve 350 is substantially identical to that of relief valves 150 and 250 described above. Relief valve 350 controls flow of pressurized fluid through operational member 346. An annular seal 362 mounted to a lower end of the operational member 346, is positioned to engage the sharp annular upper end 379 of cylinder 378 when in the closed position, as shown in FIGS. 13-15.

Figure 12:
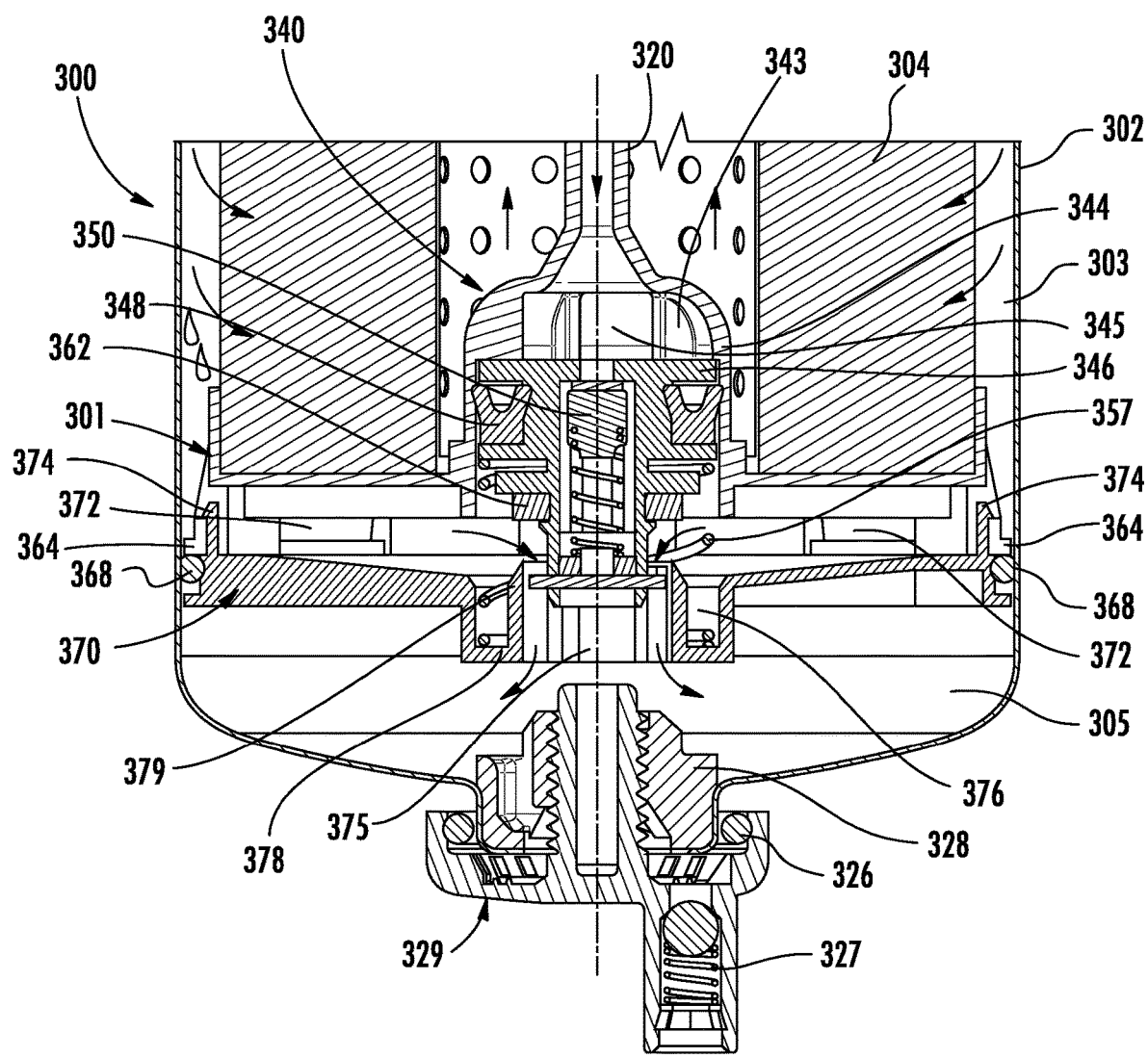
FIG. 12 is a sectional view of a further alternative configuration of a filter cartridge incorporating components of an automatic water drain system according to aspects of the present disclosure.

FIG. 12 illustrates the components of an automatic water drain system incorporating cartridge 300 in the positions corresponding to normal operation, e.g., engine running, fuel passing through the filter assembly and particulates and water being separated from the fuel flow passing through filter cartridge 300. Operational member 346 is in the open position, which permits separated water to flow from the filtration chamber 303, between the lower end cap 301 and the bottom plate 370, through the space between seal 362 and the upper end 379 of cylinder 378, and then out opening 375 in bottom plate 370 into the water accumulation chamber 305. Relief valve 350 and outlet check valve 327 are closed and both the filtration chamber 303 and water accumulation chamber 305 are exposed to a negative (or low) operating pressure as fuel is pulled through the filter cartridge 300.

As previously described, water accumulates in the water accumulation chamber 305 (or water collection chamber 312 in water collection bowl 310) until reaching a level that triggers a water evacuation cycle. Operational valve 340 receives pressurized fluid through pressure line 320 under direction of a control circuit. Fluid fills pressure chamber 345 and upon reaching actuating pressure P1, generates sufficient force to move the operational member 346 against the bias of spring 357 from the open position of FIGS. 12 and 16 to the closed position of FIGS. 13-15. The component positions shown in FIG. 13 correspond to a pressure in pressure chamber 345 of between P1 and the opening pressure P2 of the relief valve 350, which remains closed. At this point, operational member 346 is at the end of its travel, so pressure in chamber 345 rises as more pressurized fluid enters through pressure line 320. FIG. 14 illustrates the component positions when the chamber reaches the relief valve opening pressure P2, which opens relief valve 350 and allows pressurized fluid to pass through operational member 346 and enter the water accumulation chamber 305. P2 is greater than P1, so operational valve 340 remains closed at all times when relief valve 350 is open, and the relief valve 350 cannot open until the operational valve 340 has closed. Pressurized fluid entering the water accumulation chamber 305 forces water through check valve 327 when the pressure in the water accumulation chamber 305 exceeds the opening pressure P3 of check valve 327. P3 can be relatively light because the water accumulation chamber 305 (or the water collection chamber 312) is normally exposed to the negative (or low) pressure of the filtration chamber 303 during engine operation or situations where the engine is not operating, such as storage. Opening pressure P3 is less than the actuating pressure P1 of operational valve 340, to reduce the likelihood of pressurized fluid being forced past the closed operational member 346 during a water evacuation cycle. The opening pressure P3 of the outlet check valve 327 is high enough that the check valve 327 remains closed at all times other than during a water evacuation cycle. FIG. 15 illustrates component positions corresponding to water being forced out of the water accumulation chamber 305 through the outlet check valve 327.

Drain caps 229, 329 are of the same construction, both incorporating a radial seal 226, 326 between a peripheral lip of the cap 229, 329 and the cartridge housing surrounding a drain nut 228, 328 or the exterior of an outlet from an attached water collection bowl 210, 310. This sealing arrangement allows a flow path from the water accumulation chamber 205, 305 of the relevant cartridge 200, 300 through the drain nut 228, 328 to remain in communication with outlet check valve 227, 327. An axially compressed seal on the drain cap would obstruct the flow path, so the outlet check valves 227, 327 would not be exposed to the pressure in the accumulation chambers 205, 305 or the water collection chambers 212, 312. This arrangement of drain caps 229, 329, incorporating outlet check valves 227, 327 allows water to be evacuated by fluid pressure, without human intervention.

Figure 17:
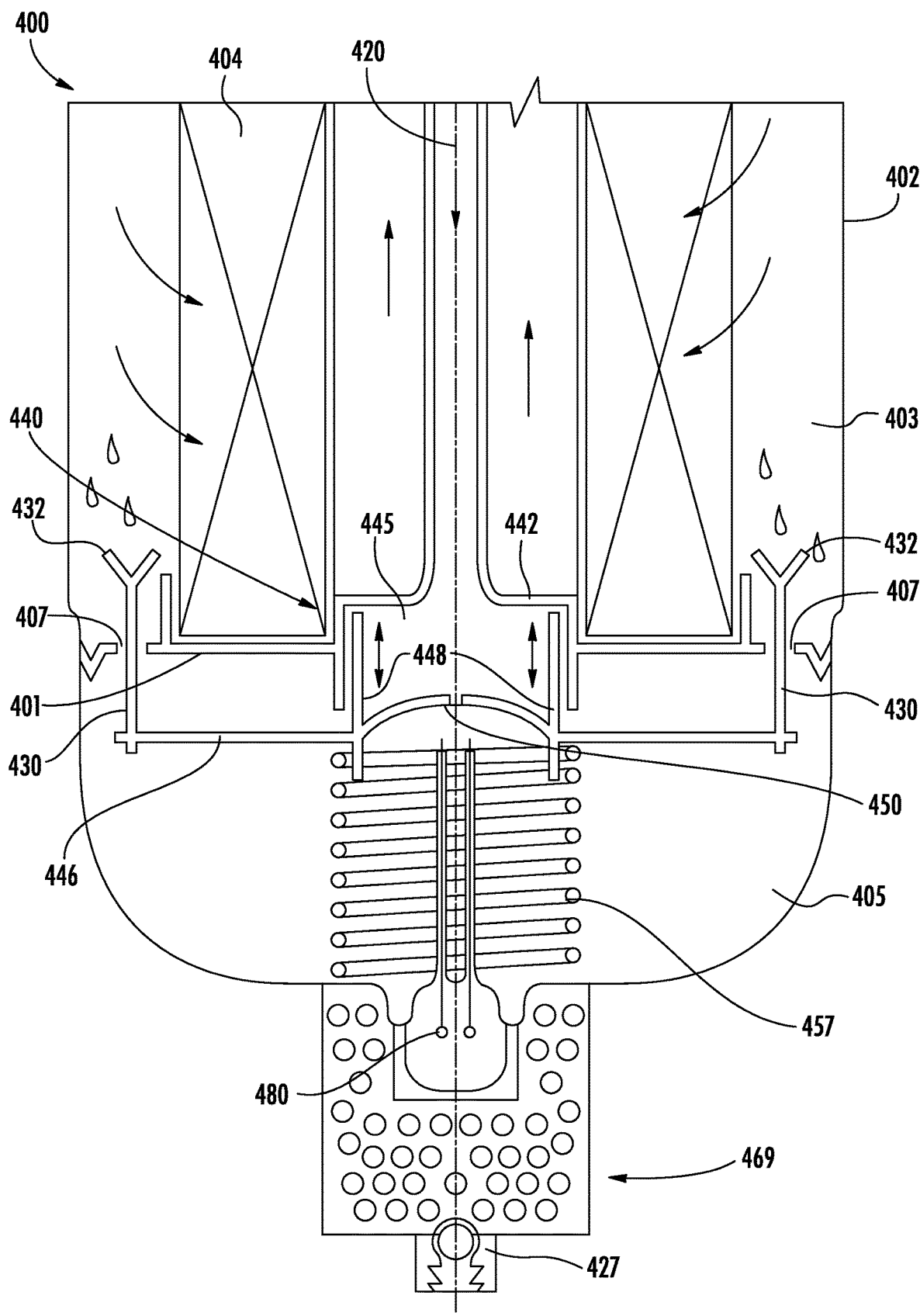
FIG. 17 is a sectional view of a further alternative filter cartridge equipped with components of an automatic water drain system according to aspects of the disclosure.

FIG. 17 is a sectional view through a filter cartridge 400 incorporating an alternative fluid actuated operational valve 440. Filter cartridge 400 is used in conjunction with a filter head in a manner consistent with filter cartridges 200 and 300 described above. Operational valve 440 receives pressurized fluid under direction of a control circuit as previously described. Cartridge 400 is illustrated in conjunction with a water filter 469 arranged to remove VOCs and traces of fuel from water being discharged through outlet check valve 427. A water sensor 480 detects a high water level in water accumulation chamber 405 and generates a signal to initiate a water evacuation cycle according to aspects of the disclosure. Water sensor 480 is positioned in a flow of pressurized fluid passing through operational valve 440, which may reduce the likelihood that the sensor 480 will be fouled with particulates or accumulated organic growth.

Cartridge housing 402 surrounds a cylindrical arrangement of filter media 404 that may be treated or selected to have surface properties that reject water as is known in the art. A lower end cap 401 is attached to the lower end of the filter media 404 and extends radially to engage the inside surface of the filter housing 402. The portion of the lower end cap 401 radially outward of the filter media 404 defines a plurality of openings 407 that permit separated water to descend from the filtration chamber 403 to the water accumulation chamber 405. Lower end cap 401 also includes a cylindrical cup 442 in communication with pressure line 420. Lower end cap 401 may be a single molded part or may be assembled from a plurality of complementary components.

Operational valve 440 may be described as a "bifurcating valve", because it functions to separate the filtration chamber 403 from the water accumulation chamber 405, thereby "bifurcating" the interior of the filter cartridge 400 into separate areas that are not in fluid communication with each other. Operational valve 440 includes an operational member 446 with a cylindrical collar 448 configured to slidingly seal against an inside surface of the cup 442 to enclose a pressure chamber 445. A sliding seal can be provided by any means known in the art, some of which have been discussed above. A bleed orifice 450 is configured to permit a known quantity of pressurized fluid to pass through the operational member 446 during a water evacuation cycle according to aspects of the disclosure. Operational member 446 also includes appendages 430 that extend axially through openings 407 to support plugs 432 above the lower end plate 401. Pressure chamber 445 and bleed orifice 450 are designed so that a pre-determined flow of pressurized fluid will overcome the bias of spring 457 and move the operational member from the open position shown in FIG. 17 to a closed position where the plugs 432 fill openings 407, separating the filtration chamber 403 from the water accumulation chamber 405. During a water evacuation cycle, the operational member 446 is maintained in the closed position, while a controlled flow of fluid passes through bleed orifice 450 to pressurize the water accumulation chamber 405. Fluid entering the water accumulation chamber 405 will displace water when the opening pressure of outlet check valve 427 is reached. Operational valve 440 is a simplified design that achieves the desired functionality with fewer parts.

While preferred embodiments have been shown and described, various substitutions and modifications may be made thereto. Accordingly, it is understood that the present embodiments have been described by way of illustration and not limitation.

The invention claimed is:

1. A system for removing accumulated water from a filter assembly, said system and filter assembly comprising:
    a source of pressurized fluid;
    a filtration chamber enclosing filter media said filtration chamber in fluid communication with a source of fluid to be filtered and an outlet for filtered fluid;
    a water accumulation chamber in fluid communication with the filtration chamber through a passage arranged to allow a volume of water separated from a flow of fluid to be filtered through said filter media to pass from the filtration chamber to the water accumulation chamber;
    a water detector situated to detect the volume of water present in said water accumulation chamber and generate a signal corresponding to a level requiring water to be removed from the water accumulation chamber;
    an operational valve having a valve member arranged to selectively close the passage and permit pressurized fluid to enter the water accumulation chamber while said passage is closed;
    an outlet valve operable for releasing fluid from the water accumulation chamber when exposed to a pre-determined pressure in said water accumulation chamber;
    a pressure line communicating said pressurized fluid to the operational valve; and
    a control circuit responsive to said signal to deliver pressurized fluid to said operational valve through said pressure line;
    wherein pressurized fluid delivered to said operational valve moves said valve member to close the passage, separating said filtration chamber from said water accumulation chamber, while pressurized fluid passing through said operational valve produces said pre-determined pressure in said water accumulation chamber and forces water through said outlet valve, reducing the volume of water in said water accumulation chamber.

2. The system of claim 1, wherein an actuation pressure P1 in said operational valve generates force sufficient to overcome a bias urging said valve member toward an open position, and a second fluid pressure P2 greater than P1 opens a relief valve to permit pressurized fluid to enter said water accumulation chamber.

3. The system of claim 1, wherein pressurized fluid is applied to said operational valve for a period of time corresponding to a pre-determined volume of water being forced through said outlet valve.

4. The system of claim 1, wherein said fluid to be filtered is fuel and said pressurized fluid is fuel pressurized by a lift pump or a fuel injection pump.

5. The system of claim 1, wherein the pressurized fluid is compressed air.

6. The system of claim 1, wherein said fluid to be filtered is hydraulic fluid and said pressurized fluid is hydraulic fluid pressurized by a hydraulic fluid pump.

7. The system of claim 1, wherein said filtration chamber is defined by the housing of a filter cartridge and said operational valve is arranged within said filter cartridge.

8. The system of claim 1, wherein said filtration chamber is defined by the housing of a filter cartridge, said operational valve is located within the housing of said filter cartridge and said water accumulation chamber is defined by a module comprised of housing separate from and mechanically secured to the housing of said filter cartridge.

9. The system of claim 1, wherein said filtration chamber and said water accumulation chamber are defined within the housing of a filter cartridge.

10. The system of claim 1, wherein the outlet valve is normally biased to a closed position and is opened when pressure in the accumulation chamber is sufficient to overcome the bias.

11. The system of claim 1, wherein the water detector is arranged to close a ground path when the water reaches the predetermined level.

12. The system of claim 1, wherein the valve member is moveable on a guide.

13. The system of claim 1, wherein the valve member is moveable on a hollow guide and is configured to allow pressurized fluid to flow into the water accumulation chamber.

14. The system of claim 1, wherein said fluid to be filtered is fuel and said pressurized fluid is fuel pressurized by a lift pump or a fuel injection pump drawing fuel through the filter media.

* * * * *